US012223744B2

(12) United States Patent
Stein et al.

(10) Patent No.: US 12,223,744 B2
(45) Date of Patent: *Feb. 11, 2025

(54) VEHICLE ENVIRONMENT MODELING WITH A CAMERA

(71) Applicant: Mobileye Vision Technologies Ltd., Jerusalem (IL)

(72) Inventors: Gideon Stein, Jerusalem (IL); Itay Blumenthal, Tel Aviv (IL); Jeffrey Moskowitz, Tel Aviv (IL); Nadav Shaag, Jerusalem (IL); Natalie Carlebach, Ra'anana (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/777,212

(22) PCT Filed: Mar. 1, 2021

(86) PCT No.: PCT/US2021/020272
§ 371 (c)(1),
(2) Date: Sep. 9, 2022

(87) PCT Pub. No.: WO2022/186814
PCT Pub. Date: Sep. 9, 2022

(65) Prior Publication Data
US 2024/0177417 A1    May 30, 2024

(51) Int. Cl.
*G06V 20/56*    (2022.01)
*B60W 40/06*    (2012.01)
(Continued)

(52) U.S. Cl.
CPC .......... *G06V 20/588* (2022.01); *B60W 40/06* (2013.01); *G06T 3/18* (2024.01); *G06T 5/50* (2013.01);
(Continued)

(58) Field of Classification Search
CPC .. G06T 17/05; G06T 7/50; G06T 5/60; G06T 5/50; G06T 3/18; G06T 2207/20084; G06T 2207/20081; G06V 20/588; G06V 20/56
See application file for complete search history.

(56) References Cited

U.S. PATENT DOCUMENTS 9,256,791 B2 *   2/2016   Stein ................. G06T 7/344
9,826,199 B2 *   11/2017  Stein ................. G06V 20/588
(Continued)

FOREIGN PATENT DOCUMENTS

CN      116057578 A       5/2023
DE      112021004501 T5   9/2023
WO      2022186814        9/2022

OTHER PUBLICATIONS

Miksch, Michael, Bin Yang, and Klaus Zimmermann. "Automatic extrinsic camera self-calibration based on homography and epipolar geometry." 2010 IEEE Intelligent Vehicles Symposium. IEEE, 2010. (Year: 2010).*

(Continued)

*Primary Examiner* — King Y Poon
*Assistant Examiner* — Vincent Peren
(74) *Attorney, Agent, or Firm* — Schwegman Lundberg & Woessner, P.A.

(57) ABSTRACT

System and techniques for vehicle environment modeling with a camera are described herein. A device for modeling an environment comprises: a hardware sensor interface to obtain a sequence of unrectified images representative of a road environment, the sequence of unrectified images including a first unrectified image, a previous unrectified image, and a previous-previous unrectified image; and processing circuitry to: provide the first unrectified image, the previous unrectified image, and the previous-previous unrectified image to an artificial neural network (ANN) to (Continued)

produce a three-dimensional structure of a scene; determine a selected homography; and apply the selected homography to the three-dimensional structure of the scene to create a model of the road environment.

39 Claims, 13 Drawing Sheets

(51) Int. Cl.
  *G06T 3/18* (2024.01)
  *G06T 5/50* (2006.01)
  *G06T 5/60* (2024.01)
  *G06T 7/50* (2017.01)
  *G06T 17/05* (2011.01)

(52) U.S. Cl.
  CPC ............... *G06T 5/60* (2024.01); *G06T 7/50* (2017.01); *G06T 17/05* (2013.01); *B60W 2420/403* (2013.01); *G06T 2207/20081* (2013.01); *G06T 2207/20084* (2013.01)

(56) References Cited

U.S. PATENT DOCUMENTS

| | | | |
|---|---|---|---|
| 10,115,024 B2* | 10/2018 | Stein | G06V 20/588 |
| 10,764,517 B2* | 9/2020 | Stein | H04N 23/69 |
| 10,872,433 B2* | 12/2020 | Stein | G08G 1/165 |
| 11,170,466 B2* | 11/2021 | Livyatan | G06T 7/579 |
| 11,341,614 B1 | 5/2022 | Chen et al. | |
| 11,568,653 B2* | 1/2023 | Stein | G06T 3/18 |
| 11,803,981 B2* | 10/2023 | Stein | G06V 20/58 |
| 11,869,253 B2* | 1/2024 | Stein | G06T 3/18 |
| 2015/0086080 A1 | 3/2015 | Stein et al. | |
| 2019/0325595 A1 | 10/2019 | Stein et al. | |
| 2022/0084230 A1 | 3/2022 | Guizilini et al. | |
| 2022/0366706 A1 | 11/2022 | Stein et al. | |
| 2023/0162513 A1 | 5/2023 | Stein et al. | |

OTHER PUBLICATIONS

Chen, Yiman, Zhiyu Xiang, and Wentao Du. "Improving lane detection with adaptive homography prediction." The Visual Computer 39.2 (2023): 581-595. Published: Jan. 10, 2022 (Year: 2022).*

U.S. Appl. No. 17/841,937, filed Jun. 16, 2022, Vehicle Environment Modeling with a Camera.

"International Application Serial No. PCT/US2021/020272, International Search Report mailed Nov. 29, 2021", 4 pgs.

"International Application Serial No. PCT/US2021/020272, Written Opinion mailed Nov. 29, 2021", 5 pgs.

"U.S. Appl. No. 17/841,937, Notice of Allowance mailed Sep. 26, 2022", 9 pgs.

"U.S. Appl. No. 18/095,626, Non Final Office Action mailed Jul. 27, 2023", 10 pgs.

"U.S. Appl. No. 18/095,626, Notice of Allowance mailed Aug. 23, 2023", 7 pgs.

"U.S. Appl. No. 18/095,626, Response filed Aug. 8, 2023 to Non Final Office Action mailed Jul. 27, 2023", 9 pgs.

"International Application Serial No. PCT/US2021/020272, International Preliminary Report on Patentability mailed Sep. 14, 2023", 7 pgs.

* cited by examiner

VEHICLE ENVIRONMENT MODELING WITH A CAMERA

This application is a U.S. National Stage Filing under 35 U.S.C. 371 from International Application No. PCT/US2021/020272, filed on Mar. 1, 2021, which application is incorporated herein by reference in its entirety.

TECHNICAL FIELD

Embodiments described herein generally relate to computer vision techniques and more specifically to vehicle environment modeling with a camera.

BACKGROUND

Autonomous or semi-autonomous automotive technologies, often referred to as "self-driving" or "assisted-driving" operation in automobiles, are undergoing rapid development and deployment in commercial- and consumer-grade vehicles. These systems use an array of sensors to continuously observe the vehicle's motion and surroundings. A variety of sensor technologies may be used to observe the vehicle's surroundings, such as the road surface and boundaries, other vehicles, pedestrians, objects and hazards, signage and road markings, and other relevant items.

Image-capture sensors that are implemented with one or more cameras are particularly useful for object detection and recognition, and reading signs and road markings. Camera-based systems have been applied for measuring three-dimensional structures, such as the vertical contour of the road, lane markers, and curbs, and in detecting objects or hazards. Practical sensor systems are expected to operate reliably in varying weather and road conditions. These expectations tend to introduce myriad challenges in processing the inputs. Input noise from shadows or lights at night may interfere with road surface detection. Wet roads, or other reflective surfaces, often introduce apparent motion that is contrary to road surface models. Further, the need for fast (e.g. real-time) detection of hazards while modeling road surfaces to enable autonomous or assisted driving imposes a burden on hardware given these road surface detection difficulties.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
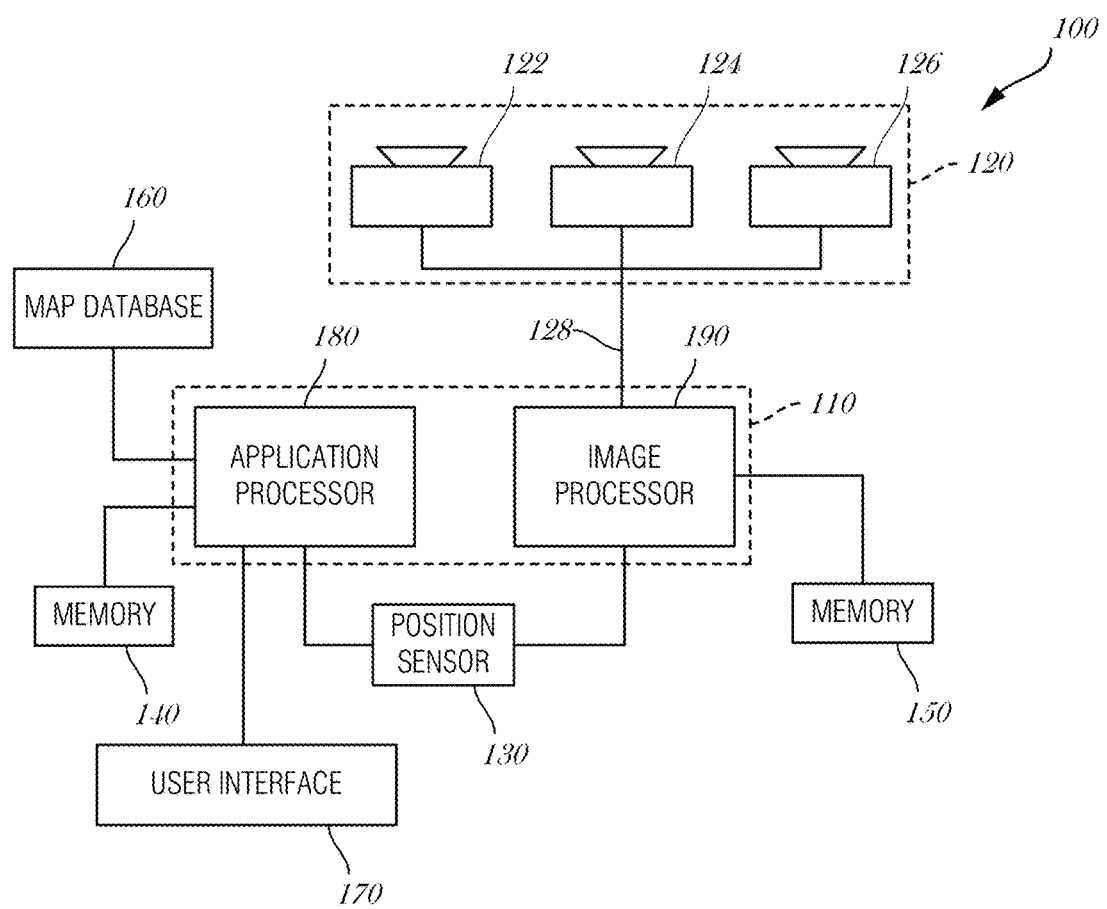
FIG. 1 is a block diagram representation of a system consistent, according to an embodiment.

In the following description, for purposes of explanation, numerous specific details are set forth in order to provide a thorough understanding of some example embodiments. It will be evident, however, to one skilled in the art that the present disclosure may be practiced without these specific details.

A variety of vehicle environment modeling techniques may be used with a variety of sensor configurations. When using a camera (e.g., visual light spectrum, infrared (IR), etc.), the sensors produce an image composed of pixels. Various features of the pixels, such as color or luminance values, may be used in modeling. Generally, to model a dynamic environment, a sequence of images is analyzed and based on the movement of pixels between sequential images, aspects of the environment may be inferred. These aspects may include features such as the host vehicle movement, how other vehicles are moving, how other objects captured in the images (e.g., people, animals, balls, etc.) are moving, obstacles in the road, road surface features (e.g., potholes, speed bumps, lane markers, etc.), and the like.

In previous systems and implementations, an artificial intelligence (AI) system is trained to compute aspects of a scene captured by an image capture system. An AI system (e.g., machine learning system, artificial neural network (ANN), deep ANN (DNN), convolutional ANN (CNN), etc.) may be trained to compute gamma from a sequence of images. Gamma is understood to be H/Z, which is a ratio of height H of a pixel above a plane (e.g., the road surface) and distance Z of a pixel to the sensor (e.g., image capture device).

From gamma, a height of a pixel above the road plane and a distance to that pixel may be determined. Such road surface modeling may be useful to, for example, avoid potholes or adjust suspension for speed bumps. Determining gamma directly from sensor data (e.g., by an ANN) may be superior to other techniques-such as using two-dimensional (2D) optical flow to ascertain residual flow, or an ANN to determine height above plane and distance to the sensor of a pixel techniques-because it enforces epipolar constraints.

Although the ANN may be trained to directly determine the depth or the height of a given point, using gamma provides a few benefits. For example, gamma computation is more stable than depth because significant changes in height from the plane may result in small relative changes in depth from the camera. Also, given H and the reference plane, it is possible to compute depth Z and then the residual flow, but this adds complexity because the ANN processes more data for the same result. In previous implementations, this is also a reason to pre-warp images with a plane model and provide ego-motion (EM) (e.g., motion of the sensor or vehicle such as the epipole $\vec{e}$ and $$\frac{T_Z}{d'_\pi}$$

as input, where $T_Z$ represents translation of a sensor in the forward direction (e.g., how far did the vehicle move between images) and $d'_\pi$ represents the height of the sensor from the plane).

In implementations that compute the depth Z or height H instead of gamma, homography plane input parameters may be provided to the ANN. For example, the plane may be defined as a horizon line (e.g., the vanishing line of the plane) and a distance to the plane. The line may be provided as a pair of distance images, and the distance to the plane provided as a constant image. This is similar to the way epipole and $T_Z$ are provided as input above. The input images may be aligned to account only for rotation (e.g., using a homography using a plane at infinity) and compute Z.

In another implementation, instead of computing gamma for the whole image and then using only the gamma along a particular path (e.g., for suspension control), the ANN may be trained to produce gamma only along a specified path. This may be more computationally efficient, for example if the output is only used for something applicable to vehicle tires, such as suspension control because the deconvolutional operations may be computationally expensive. Path discrimination (e.g., producing gamma only for the path) may be implemented in a number of ways. For example, the path may be given as input at the inference stage of the ANN, the ANN being trained to only output values along the path. In another implementation, the full ANN may be trained to produce gamma as described above. Then, during inference, when the path is given, a determination is made as to which (de)convolutions are required in the expansion stage for the path and only those deconvolutions are applied. For example, to determine gamma values for a complete row of output, convolutions along a whole row are needed. However, for only a segment of the output row related to a path, the deconvolutions need only be performed in a certain range corresponding to the segment.

In previous implementations, the images were first rectified before being input to the ANN. Image rectification is a process to transform an image onto a common image plane. In the context of this application, rectification includes taking a raw image that may be distorted from lens geometry and transforming it to a pinhole camera model. A pinhole camera model does not include geometric distortions or blurring of objects that are caused by lenses and finite sized apertures.

In the systems and mechanisms described in the present document, the ANN is trained using unrectified (i.e., distorted) images that are obtained from image capture devices. These unrectified images include lens distortions and other artifacts due to the use of a fixed aperture and lens. The ANN produces a gamma map as output. After the ANN is trained, the ANN is able to use unrectified images during inference to produce a gamma map. Portions of the gamma map are rectified, and then conventional geometric pinhole equations may be used to model the roadway and surrounding environment.

Processing time and power consumption is reduced because the images do not need to be pre-processed before being provided as input to the ANN. When rectification is used, it is used on a subset of image coordinates, which provides even more efficiency. These features and others are described further below.

FIG. 1, to which reference is now made, is a block diagram representation of a system consistent with the disclosed embodiments. System 100 can include various components depending on the requirements of a particular implementation. In some examples, system 100 can include a processing unit 110, an image acquisition unit 120 and one or more memory units 140, 150. Processing unit 110 can include one or more processing devices. In some embodiments, processing unit 110 can include an application processor 180, an image processor 190, or any other suitable processing device. Similarly, image acquisition unit 120 can include any number of image acquisition unit s and components depending on the requirements of a particular application. In some embodiments, image acquisition unit 120 can include one or more image capture devices (e.g., cameras), such as image capture device 122, image capture device 124, and image capture device 126. In some embodiments, system 100 can also include a data interface 128 communicatively connecting processing unit 110 to image acquisition unit 120. For example, data interface 128 can include any wired and/or wireless link or links for transmitting image data acquired by image acquisition unit 120 to processing unit 110.

Both application processor 180 and image processor 190 can include various types of processing devices. For example, either or both of application processor 180 and image processor 190 can include one or more microprocessors, preprocessors (such as image preprocessors), graphics processors, central processing units (CPUs), support circuits, digital signal processors, integrated circuits, memory, or any other types of devices suitable for running applications and for image processing and analysis. In some embodiments, application processor 180 and/or image processor 190 can include any type of single or multi-core processor, mobile device microcontroller, central processing unit, etc. Various processing devices can be used, including, for example, processors available from manufacturers such as Intel®, AMD®, etc. and can include various architectures (e.g., x86 processor, ARM®, etc.).

In some embodiments, application processor 180 and/or image processor 190 can include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP® and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third-generation processor and is six times more powerful that the EyeQ2®, may be used in the disclosed examples. In yet another example, the EyeQ4®, the fourth-generation processor, may be used in the disclosed examples.

While FIG. 1 depicts two separate processing devices included in processing unit 110, more or fewer processing devices can be used. For example, in some examples, a single processing device may be used to accomplish the tasks of application processor 180 and image processor 190. In other embodiments, these tasks can be performed by more than two processing devices.

Processing unit 110 can include various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor can include a video processor for capturing, digitizing, and processing the imagery from the image sensors. The CPU can include any number of microcontrollers or microprocessors. The support circuits can be any number of circuits generally well known in the art, including cache, power supply, clock, and input-output circuits. The memory can store software that, when executed by the processor, controls the operation of the system. The memory can include databases and image processing software, including a trained system, such as a neural network, for example. The memory can include any number of random access memories, read only memories, flash memories, disk drives, optical storage, removable storage, and other types of storage. In one instance, the memory can be separate from the processing unit 110. In another instance, the memory can be integrated into the processing unit 110.

Each memory 140, 150 can include software instructions that when executed by a processor (e.g., application processor 180 and/or image processor 190), can control operation of various aspects of system 100. These memory units can include various databases and image processing software. The memory units 140, 150 can include random access memory, read only memory, flash memory, disk drives, optical storage, tape storage, removable storage, and/or any other types of storage. In some examples, memory units 140, 150 can be separate from the application processor 180 and/or image processor 190. In other embodiments, these memory units can be integrated into application processor 180 and/or image processor 190.

In some embodiments, the system can include a position sensor 130. The position sensor 130 can include any type of device suitable for determining a location associated with at least one component of system 100. In some embodiments, position sensor 130 can include a GPS receiver. Such receivers can determine a user position and velocity by processing signals broadcasted by global positioning system satellites. Position information from position sensor 130 can be made available to application processor 180 and/or image processor 190.

In some embodiments, the system 100 can be operatively connectible to various systems, devices, and units onboard a vehicle in which the system 100 can be mounted, and through any suitable interfaces (e.g., a communication bus) the system 100 can communicate with the vehicle's systems. Examples of vehicle systems with which the system 100 can cooperate include: a throttling system, a braking system, and a steering system (e.g., throttling system 220, braking system 230, and steering system 240 of FIG. 2E).

In some embodiments, the system 100 can include a user interface 170. User interface 170 can include any device suitable for providing information to or for receiving inputs from one or more users of system 100, including, for example, a touchscreen, microphone, keyboard, pointer devices, track wheels, cameras, knobs, buttons, etc. Information can be provided by the system 100, through the user interface 170, to the user.

In some embodiments, the system 100 can include a map database 160. The map database 160 can include any type of database for storing digital map data. In some examples, map database 160 can include data relating to a position, in a reference coordinate system, of various items, including roads, water features, geographic features, points of interest, etc. Map database 160 can store not only the locations of such items, but also descriptors relating to those items, including, for example, names associated with any of the stored features and other information about them. For example, locations and types of known obstacles can be included in the database, information about a topography of a road or a grade of certain points along a road, etc. In some embodiments, map database 160 can be physically located with other components of system 100. Alternatively, or additionally, map database 160 or a portion thereof can be located remotely with respect to other components of system 100 (e.g., processing unit 110). In such embodiments, information from map database 160 can be downloaded over a wired or wireless data connection to a network (e.g., over a cellular network and/or the Internet, etc.).

Image capture devices 122, 124, and 126 can each include any type of device suitable for capturing at least one image from an environment. Moreover, any number of image capture devices can be used to acquire images for input to the image processor. Some examples of the presently disclosed subject matter can include or can be implemented with only a single-image capture device, while other examples can include or can be implemented with two, three, or even four or more image capture devices. Image capture devices 122, 124, and 126 will be further described with reference to FIGS. 2B-2E, below.

It would be appreciated that the system 100 can include or can be operatively associated with other types of sensors, including for example: an acoustic sensor, a radio frequency (RF) sensor (e.g., radar transceiver), a LIDAR sensor. Such sensors can be used independently of or in cooperation with the image acquisition unit 120. For example, the data from the radar system (not shown) can be used for validating the processed information that is received from processing images acquired by the image acquisition unit 120, e.g., to filter certain false positives resulting from processing images acquired by the image acquisition unit 120, or it can be combined with or otherwise compliment the image data from the image acquisition unit 120, or some processed variation or derivative of the image data from the image acquisition unit 120.

Figure 2A:
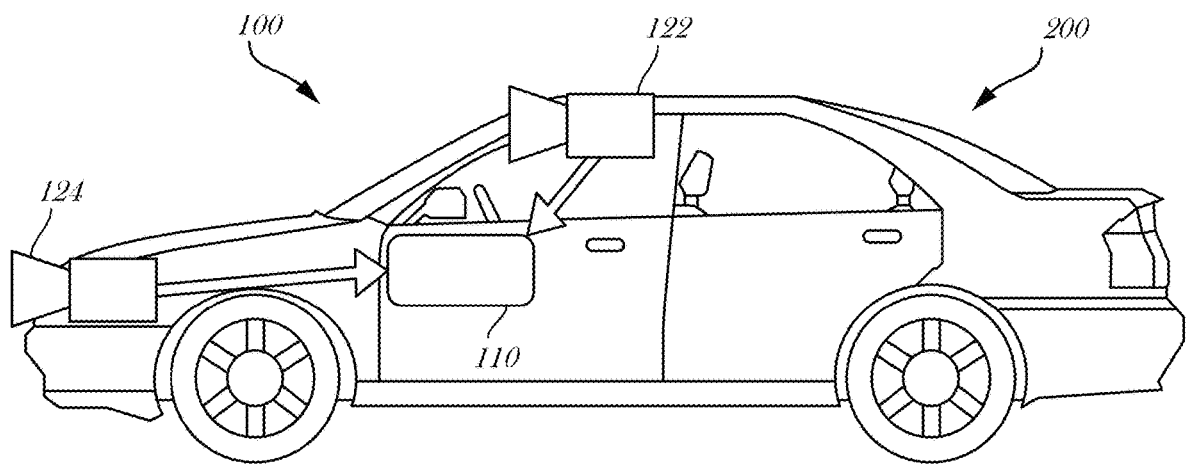
FIG. 2A is a diagrammatic side view representation of an exemplary vehicle including a system, according to an embodiment.

System 100, or various components thereof, can be incorporated into various different platforms. In some embodiments, system 100 may be included on a vehicle 200, as shown in FIG. 2A. For example, vehicle 200 can be equipped with a processing unit 110 and any of the other components of system 100, as described above relative to FIG. 1. While in some embodiments, vehicle 200 can be equipped with only a single image capture device (e.g., camera), in other embodiments, such as those discussed in connection with FIGS. 2B-2E, multiple image capture devices can be used. For example, either of image capture devices 122 and 124 of vehicle 200, as shown in FIG. 2A, can be part of an ADAS (Advanced Driver Assistance Systems) imaging set.

The image capture devices included on vehicle 200 as part of the image acquisition unit 120 can be positioned at any suitable location. In some embodiments, as shown in FIGS. 2A-2E and 3, image capture device 122 can be located in the vicinity of the rearview mirror. This position may provide a line of sight similar to that of the driver of vehicle 200, which can aid in determining what is and is not visible to the driver.

Other locations for the image capture devices of image acquisition unit 120 can also be used. For example, image capture device 124 can be located on or in a bumper of vehicle 200. Such a location can be especially suitable for image capture devices having a wide field of view. The line of sight of bumper-located image capture devices can be different from that of the driver. The image capture devices (e.g., image capture devices 122, 124, and 126) can also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc. The image capture unit 120, or an image capture device that is one of a plurality of image capture devices that are used in an image capture unit 120, can have a field-of-view (FOV) that is different than the FOV of a driver of a vehicle, and not always see the same objects. In one example, the FOV of the image acquisition unit 120 can extend beyond the FOV of a typical driver and can thus image objects which are outside the FOV of the driver. In yet another example, the FOV of the image acquisition unit 120 is some portion of the FOV of the driver. In some embodiments, the FOV of the image acquisition unit 120 corresponding to a sector which covers an area of a road ahead of a vehicle and possibly also surroundings of the road.

In addition to image capture devices, vehicle 200 can include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

Figure 2B:
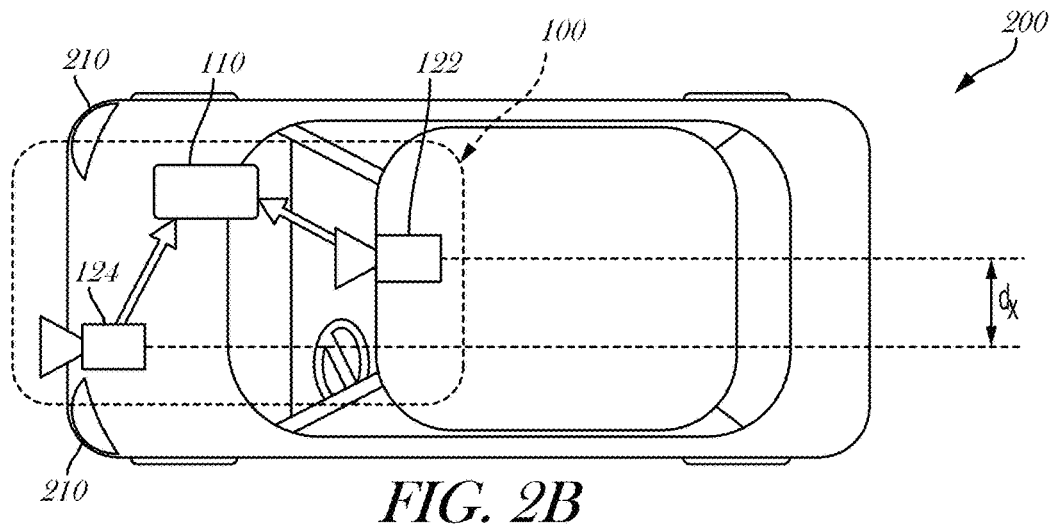
FIG. 2B is a diagrammatic top view representation of the vehicle and system shown in FIG. 2A, according to an embodiment.

FIG. 2A is a diagrammatic side view representation of a vehicle imaging system according to examples of the presently disclosed subject matter. FIG. 2B is a diagrammatic top view illustration of the example shown in FIG. 2A. As illustrated in FIG. 2B, the disclosed examples can include a vehicle 200 including a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
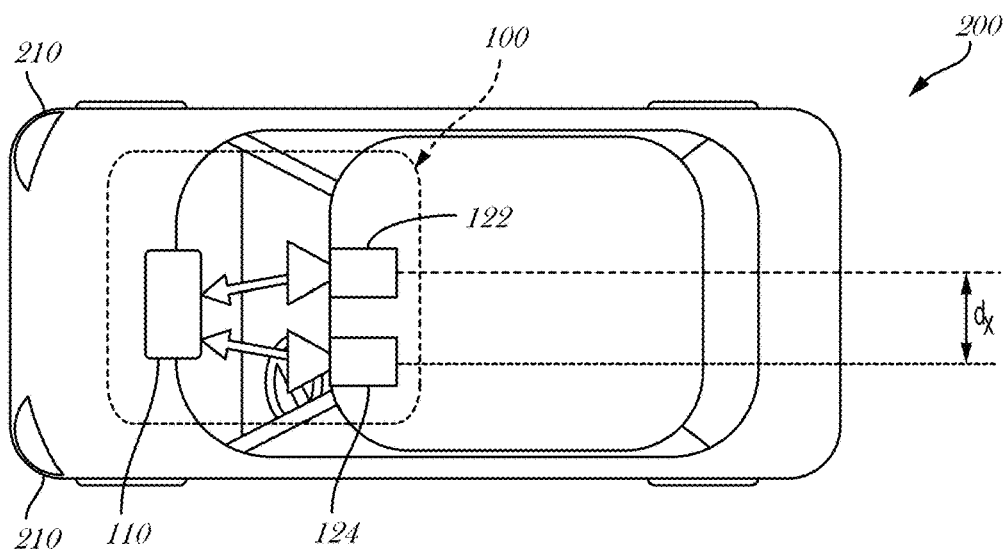
FIG. 2C is a diagrammatic top view representation of another embodiment of a vehicle including a system, according to an embodiment.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiment shown in FIG. 2D, first, second, and third image capture devices 122, 124, and 126, are included in the system 100 of vehicle 200.

Figure 2D:
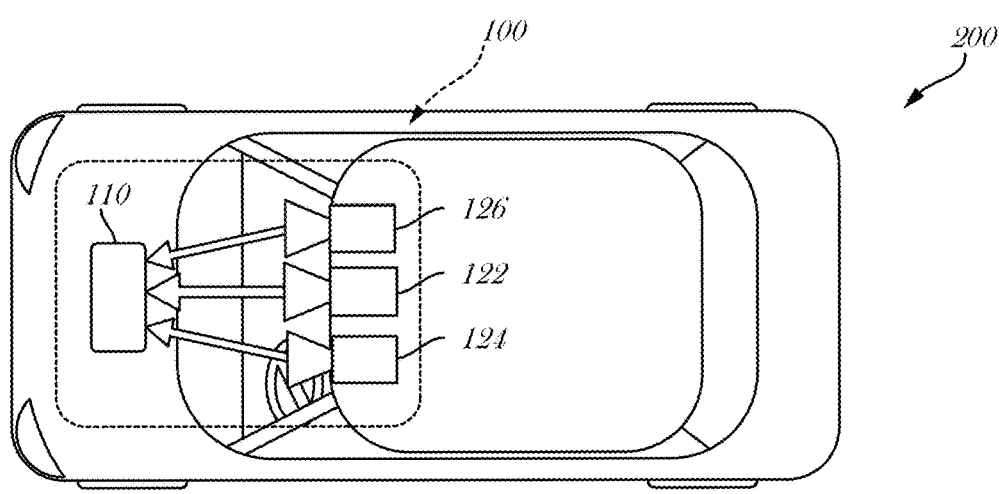
FIG. 2D is a diagrammatic top view representation of yet another embodiment of a vehicle including a system, according to an embodiment.

As shown in FIG. 2D, image capture devices 122, 124, and 126 may be positioned in the vicinity of the rearview mirror and/or near the driver seat of vehicle 200. The disclosed examples are not limited to any particular number and configuration of the image capture devices, and the image capture devices may be positioned in any appropriate location within and/or on vehicle 200.

It is also to be understood that disclosed embodiments are not limited to a particular type of vehicle 200 and may be applicable to all types of vehicles including automobiles, trucks, trailers, motorcycles, bicycles, self-balancing transport devices and other types of vehicles.

The first image capture device 122 can include any suitable type of image capture device. Image capture device 122 can include an optical axis. In one instance, the image capture device 122 can include an Aptina M9V024 WVGA sensor with a global shutter. In another example, a rolling shutter sensor can be used. Image acquisition unit 120, and any image capture device which is implemented as part of the image acquisition unit 120, can have any desired image resolution. For example, image capture device 122 can provide a resolution of 1280×960 pixels and can include a rolling shutter.

Image acquisition unit 120, and any image capture device which is implemented as part of the image acquisition unit 120, can include various optical elements. In some embodiments one or more lenses can be included, for example, to provide a desired focal length and field of view for the image acquisition unit 120, and for any image capture device which is implemented as part of the image acquisition unit 120. In some examples, an image capture device which is implemented as part of the image acquisition unit 120 can include or be associated with any optical elements, such as a 6 mm lens or a 12 mm lens, for example. In some examples, image capture device 122 can be configured to capture images having a desired (and known) field-of-view (FOV).

The first image capture device 122 may have a scan rate associated with acquisition of each of the first series of image scan lines. The scan rate may refer to a rate at which an image sensor can acquire image data associated with each pixel included in a particular scan line.

Figure 2E:
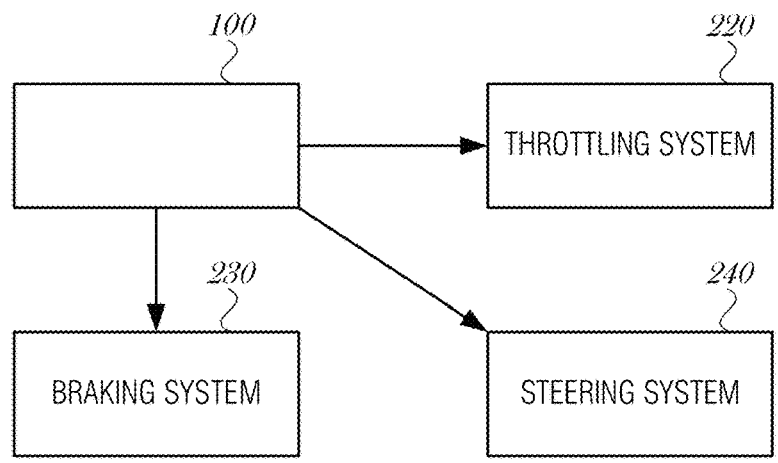
FIG. 2E is a diagrammatic representation of exemplary vehicle control systems, according to an embodiment.

FIG. 2E is a diagrammatic representation of vehicle control systems, according to examples of the presently disclosed subject matter. As indicated in FIG. 2E, vehicle 200 can include throttling system 220, braking system 230, and steering system 240. System 100 can provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 can provide control signals to one or more of throttling system 220, braking system 230, and steering system 240 to navigate vehicle 1200 (e.g., by causing an acceleration, a turn, a lane shift, etc.). Further, system 100 can receive inputs from one or more of throttling system 220, braking system 230, and steering system 240 indicating operating conditions of vehicle 200 (e.g., speed, whether vehicle 200 is braking and/or turning, etc.).

Figure 3:
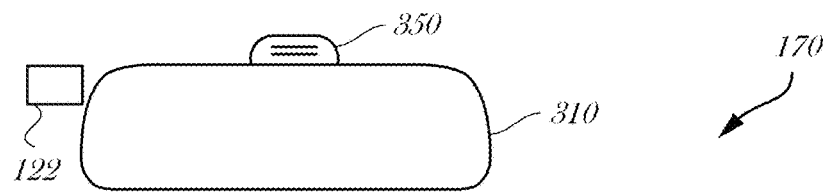
FIG. 3 is a diagrammatic representation of an interior of a vehicle including a rearview mirror and a user interface for a vehicle imaging system, according to an embodiment.
Figure 3:
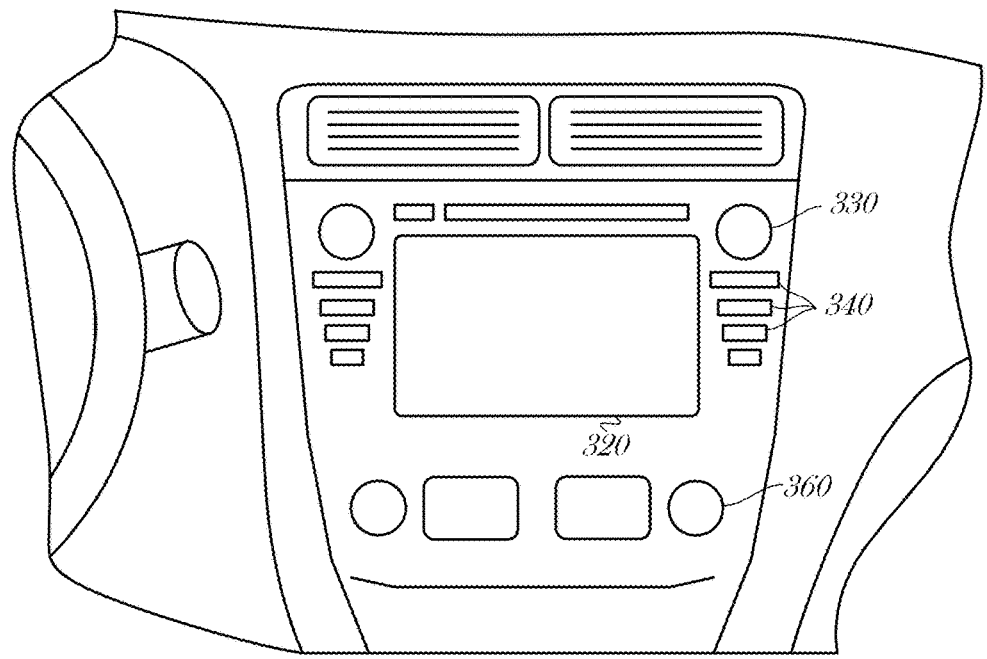

As shown in FIG. 3, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and, in response to this analysis, navigate and/or otherwise control and/or operate vehicle 200. Navigation, control, and/or operation of vehicle 200 may include enabling and/or disabling (directly or via intermediary controllers, such as the controllers mentioned above) various features, components, devices, modes, systems, and/or subsystems associated with vehicle 200. Navigation, control, and/or operation may alternately or additionally include interaction with a user, driver, passenger, passerby, and/or other vehicle or user, which may be located inside or outside vehicle 200, for example by providing visual, audio, haptic, and/or other sensory alerts and/or indications.

As discussed below in further detail and consistent with various disclosed embodiments, system 100 may provide a variety of features related to autonomous driving, semi-autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. It would be appreciated that in some cases, the actions taken automatically by the vehicle are under human supervision, and the ability of the human to intervene adjust abort or override the machine action is enabled under certain circumstances or at all times. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings, indications, recommendations, alerts, or instructions to a driver, passenger, user, or other person inside or outside of the vehicle (or to other vehicles) based on the analysis of the collected data. Additional details regarding the various embodiments that are provided by system 100 are provided below.

Figure 4:
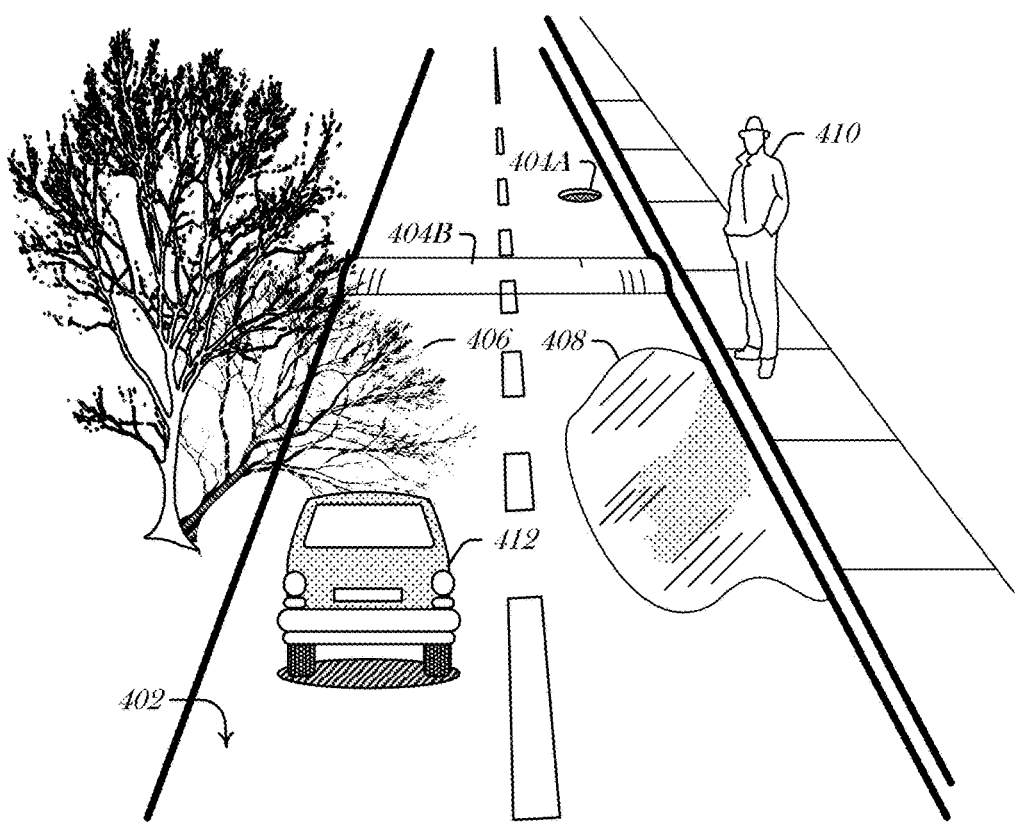
FIG. 4 is a block diagram of an example of a vehicle environment.

FIG. 4 is a diagram illustrating an example field of view 400 of a vehicle-mounted camera in which various objects are present. The camera may be mounted on a host vehicle. As depicted, the field of view 400 includes a road surface 402, which may have one or more surface features 404, such as depressions 404A (e.g., potholes, grates, depressions, etc.) or protrusions 404B (e.g., speed bumps, curbs, debris, etc.). The field of view 400 may also include a shadow 406, a reflective surface 408 (e.g., a puddle, ice, etc.), a pedestrian 410, or another vehicle 412. Modeling the surface features 404 may enable the host vehicle to avoid them, initiate an alert to a driver, or adjust itself to better handle them (e.g., adjust vehicle suspension to traverse the pothole 404A).

Understanding and modeling the pedestrian 410 or vehicle 412 may enable vehicle control changes or driver alerts to avoid colliding with them, or even avoid or reduce undesirable interactions with them, such splashing the pedestrian 410 by driving through the puddle 408, by slowing down, adjusting the driving path, stopping, or the combinations of these actions.

Figure 5:
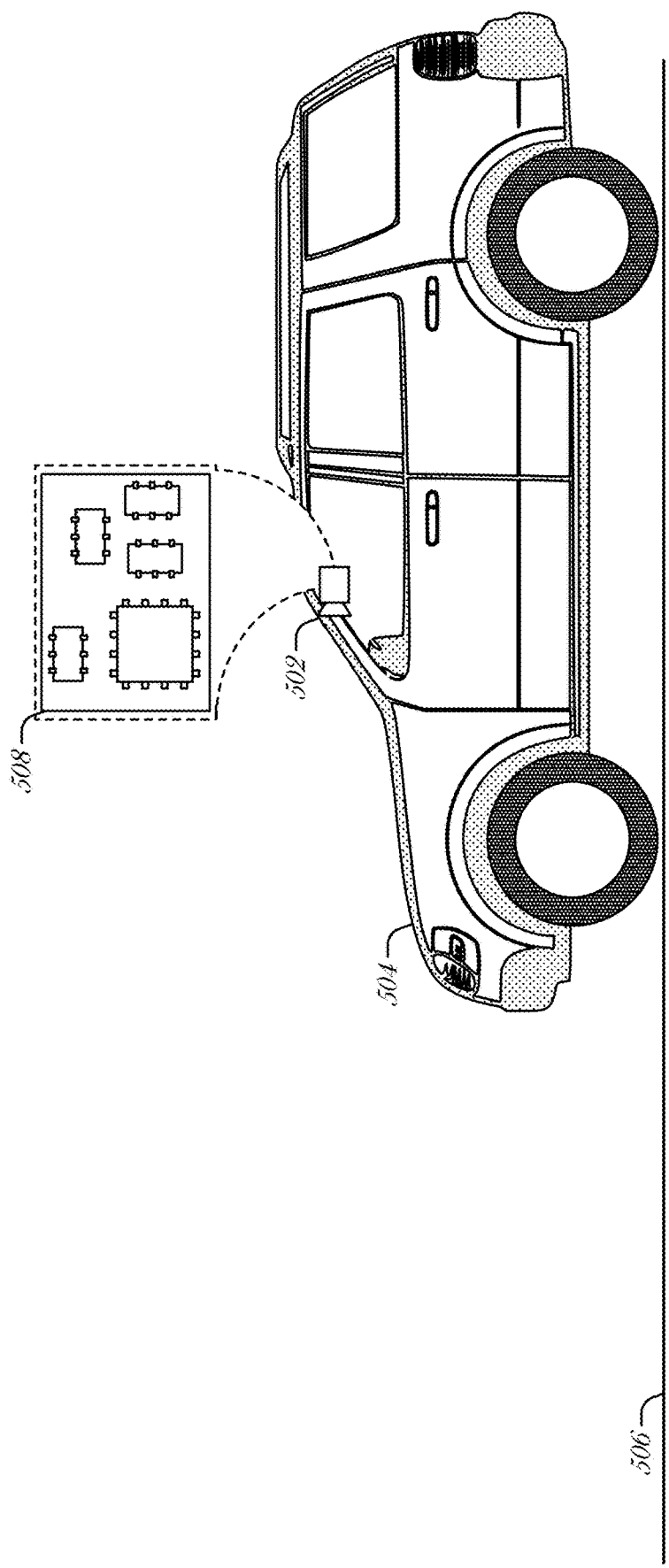
FIG. 5 is a block diagram of an example of a system for vehicle environment modeling with a camera, according to an embodiment.

FIG. 5 is a block diagram of an example of a system 508 for vehicle environment modeling with an image capture device 502, according to an embodiment. The system 508 is affixed to the vehicle 504. The system 508 may be an embodiment of or included in an embodiment with the system 100 as described in FIGS. 1-3.

In an example, the system 508 is integrated into the image capture device 502 (e.g., camera or other imaging sensor, such as LIDAR or IR sensor). In an example, the system 508 is separate from the image capture device 502 (e.g., part of an infotainment system of the vehicle 504). In the example illustrated in FIG. 5, the image capture device 502 is shown by way of example as a forward looking camera mounted on or near the windshield. However, the techniques described herein apply equally to rear or side facing image capture devices mounted inside or outside of the vehicle. One such example is a camera mounted externally on the corner of the roof with a field of view that is forward and a bit to one side.

The system 508 includes processing circuitry to perform vehicle environment modeling via images obtained from the image capture device 502. The vehicle environment modeling may include modeling the road surface 506, obstacles, obstructions, and moving bodies (e.g., other vehicles, pedestrians, animals, etc.). These models may be used by the system 508 directly, or via another management system, to adjust operating parameters of the vehicle 504. To perform the modeling, the system 508 is arranged to obtain a sequence of images representative of the road surface 506. The sequence of images may be time-ordered. For instance, the images may be captured at a regular rate (e.g., 30 Hz, 60 Hz, etc.) and tagged with metadata to store a timestamp, sequence number, index number, or other indicia of order. One of the sequence of images is a current image (e.g., the most recent or last image captured by the image capture device 502).

The system 508 is arranged to provide a data set to an artificial neural network (ANN) to produce a gamma image. In a gamma image (also referred to as a gamma map), each image coordinate is a gamma value. Hence, each "pixel" in a gamma image is a gamma value for the coordinate. As noted elsewhere, the gamma value is a ratio of a height of a point above a ground plane and a distance from a sensor that captured the image. The ground plane represents the road surface 506.

Although "gamma image" is used below, other data formats may be used to represent gamma in a scene. Thus, the gamma may not be in a raster format, but may be in any form (e.g., a gamma map of values to points) that enables the gamma value to be correlated to a surface via the sensor data.

In an example, the data set includes a portion of the sequence of images. The data set may include motion of the sensor 502 (e.g., sensor movement information) and an epipole (e.g., epipole information). In an implementation, the portion of the sequence of images includes a first image. The first image may be the current image. In other implementations, the first image is an arbitrary image from captured images.

In an example, the portion of the sequence of images includes images immediately preceding the first image, which may be referred to as a previous image and a previous-previous image. The first (e.g., current), previous, and previous-previous images may be successive images in the sequence of images or may be related only in that the previous image was captured at some time before the first image, and the previous-previous image was captured at some time before the previous image. For instance, the first image may be the third most recent image captured, and then the sequence of images may include the third, fifth, and seventh most recent images.

In an example, the portion of the sequence of images is three images in total. In an example, the sequence may include any n number of images, where n is an integer greater than one (i.e., $\{n \in \mathrm{II} | n>1\}$). In an example, images in a sequence may be consecutively captured images. In an example, some frames from an original sequence of frames may be omitted in the process of generating the sequence of images that is used in the data set.

In an example, the epipole is provided as a gradient image with the same dimensionality (albeit at a possibly greater or lesser resolution) as the first image. Here, values of pixels in the gradient image represent a distance from the epipole of pixels in the first image. In an example, the gradient image represents only horizontal (e.g., x-axis) distances from the epipole and a second gradient image is provided to the ANN to represent vertical (e.g., y-axis) distances from the epipole.

In an example, the motion of the sensor 506 is provided as a constant value image with a same dimensionality (albeit at a possibly greater or lesser resolution) as the current image. In an example, the constant value is a ratio of forward motion of the sensor 506 (e.g., z-axis) by a height of the sensor 502 from the plane 506.

In an example, the ANN is a convolutional neural network (CNN). In an example, the motion of the sensor 506 and the epipole are provided to the CNN at a bottleneck layer (e.g., see the discussion below with respect to FIG. 6).

In an example, the ANN is trained with an unsupervised training technique in which error is determined by measuring a difference between a model of a future image and the actual future image. Here, the model of the future image is produced via a gamma warping of an image previous to the future image. Thus, in this example, the inferred gamma value is used to predict what the future image will look like. When compared to the future image, deviations from the model are used to correct the ANN. The training of the ANN is described in more detail in FIG. 7-10.

In an example, the ANN is trained with an unsupervised training technique in which error is determined by measure a difference between predicted gamma for a location and sensor 502 movement at the location. Thus, gamma is predicted and the ego-motion of the sensor 502 or vehicle 504 is used to determine whether the gamma inference was correct (or how wrong the inference was). In this example, if the ANN predicts a dip in the road surface 506, and no such dip is later detected by the vehicle, then the training corrects the inference that predicted the dip. In an example, the sensor movement may include one of more of pitch, yaw, roll, or translation perpendicular to the plane.

In an example, the ANN is trained with an unsupervised training technique in which error is determined by a difference in gamma of overlapping segments between two images at two different times, wherein the inference is performed on the first image, and wherein the overlapping segment is closer to the sensor 502 in the second image. Thus, in training, an image with a view of the surface 506 that is later traversed by the vehicle 504 is the previous image. The gamma value of the overlapping segment is inferred by the ANN and checked by computing the gamma value of the same segment in the future image. When the sensor 502 is closer to a feature (e.g., the overlapping segment in the future), then the system's estimate of the gamma is probably better, and may be used in the loss function to train the ANN. Thus, the gamma map inferred from a current triple of images is compared to the gamma map inferred from a future triple of images warped towards the current gamma map. The comparison value between the two gamma maps, such as the difference or the distance to the closest surface point, is used as part of the loss when training the ANN.

The system 508 is arranged to model the road surface 506 using the gamma image. In an example, modeling the road surface 506 includes computing a vertical deviation from the plane of a road surface feature. In an example, modeling the road surface 506 includes computing residual motion of features in the sequence of images. Here, the residual motion of a feature is a product of the gamma value, the motion of the sensor 502, and the epipole.

In an example, modeling the road surface includes warping a previous image to the current image using the gamma value. The gamma-based warping is particularly accurate because the gamma enables a feature to be matched between images based on its distance from the sensor 502 and its height above the road surface 506 rather than trying to match sometimes ephemeral or complex color variations of pixels of those features in the images.

Figure 6:
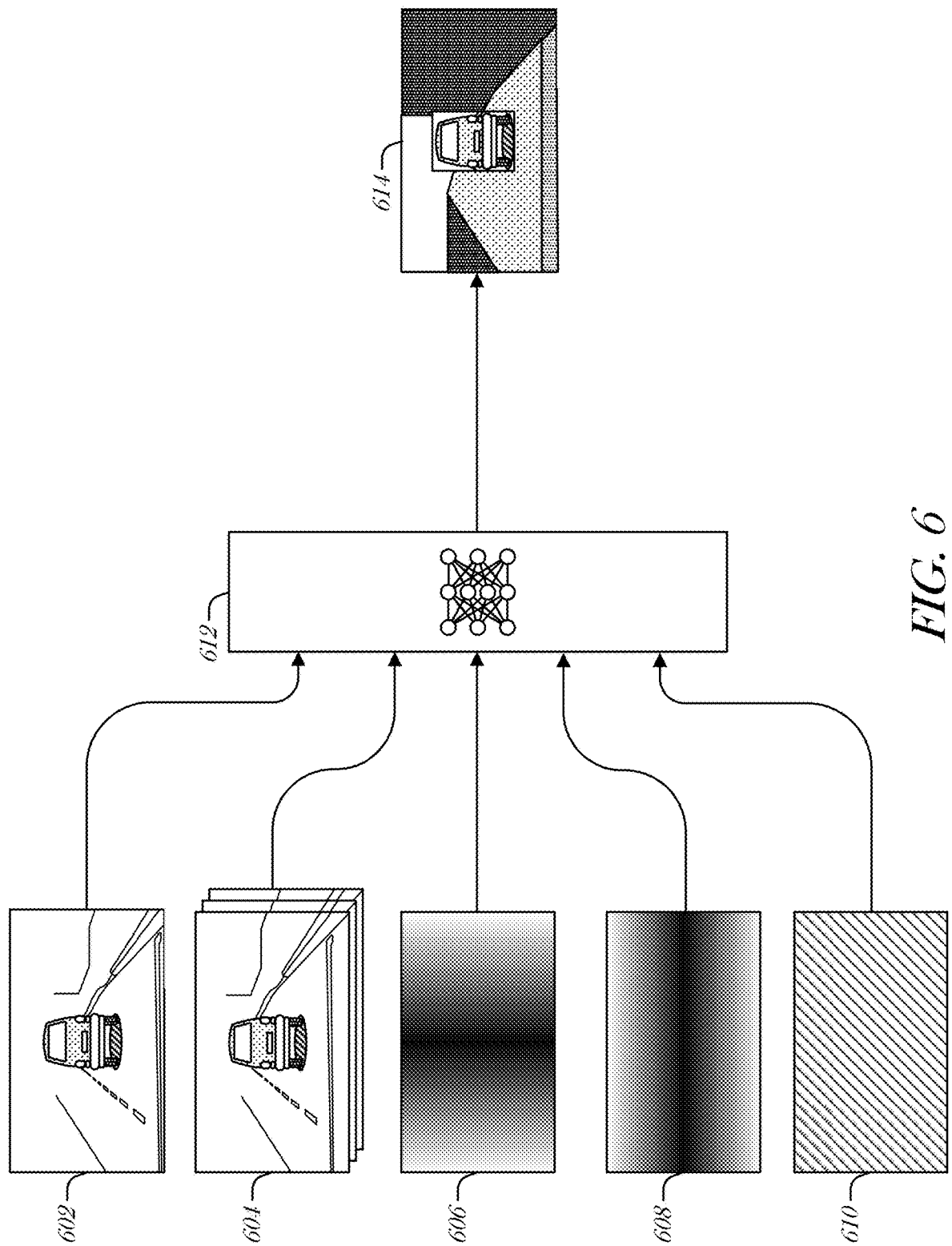
FIG. 6 illustrates an example of a neural network to produce a gamma model of a road surface, according to an embodiment.

FIG. 6 illustrates an example of a neural network 612 to produce a gamma map 614 of a road surface, according to an embodiment. However, as an overview, the residual motion for each pixel is composed of three parts: gamma, sensor (e.g., vehicle) motion, and epipole information, as follows:

$$\vec{\mu} = \frac{H}{Z}\frac{T_z}{d'_\pi}(\vec{e} - \vec{p}_w)$$

Epipole information depends on the image coordinate after the homography $\vec{p}_w$ and the epipole $\vec{e}$. This may be calculated for each pixel given the ego-motion (EM) of the sensor. Sensor movement information depends on the forward motion $T_z$ and the sensor height from the plane $d'_\pi$. This is fixed for the whole image.

Gamma describes the structure of a scene at each pixel via the height H of a point above the plane and a distance Z to the point from the sensor. Thus, given the sensor movement information and the epipole information, the neural network 612 determines the gamma map 614, and the residual motion for each point may be calculated to enable one image to be warped to another.

Given an accurate gamma map 614, image warping is very accurate, often behaving as if the images were of a static scene, because of the distance and height of each pixel. Classic techniques first computed the residual flow and then the gamma was computed by removing the epipole information and the sensor movement information. From gamma the height and the distance of a point were computed along one or more tracks (e.g., tire paths). As noted above, however, the varying degree of noise in road surface images caused direct residual motion detection to sometimes be problematic.

Training the neural network 612 to calculate gamma directly from the images provides a robust counter to the noise found in the images. Thus, given a first image 602, which may be the current image, one or more previous images 604 warped using a homography, and the ego-motion 610 and epipole (e.g., plane) parameters (images 606 and 608) as input, the neural network 612 produces an image of gamma values 614 as output. As illustrated, the lighter the shading in the gamma map 614, the lower the gamma value. Also, the vehicle is omitted from the loss calculation to train the neural network 612. This is done to prevent the motion of the vehicle from affecting nearby gamma values during training. The vehicle will generally not be masked during inference. In an example, the vehicle, or other moving objects, are not masked from the neural network 612 loss function during training.

As illustrated, the epipole information and the sensor movement information are provided as images (e.g., a raster of values). The sensor movement information image 610 is a constant valued image (e.g., every pixel has the same value). The epipole information represented by two images respectively having pixels values of a distance to the epipole in horizontal (e.g., x) 606 and vertical (e.g., y) 608 directions. Providing the epipole information as gradient images, rather than two values, is helpful when using a convolutional neural network (CNN). In a CNN, the same filter bank is run over the whole image 602, and each image region must be told where it is in relation to the epipole. By using the gradient images 606 and 606, the filter has the epipole information for each convolution.

Figure 7:
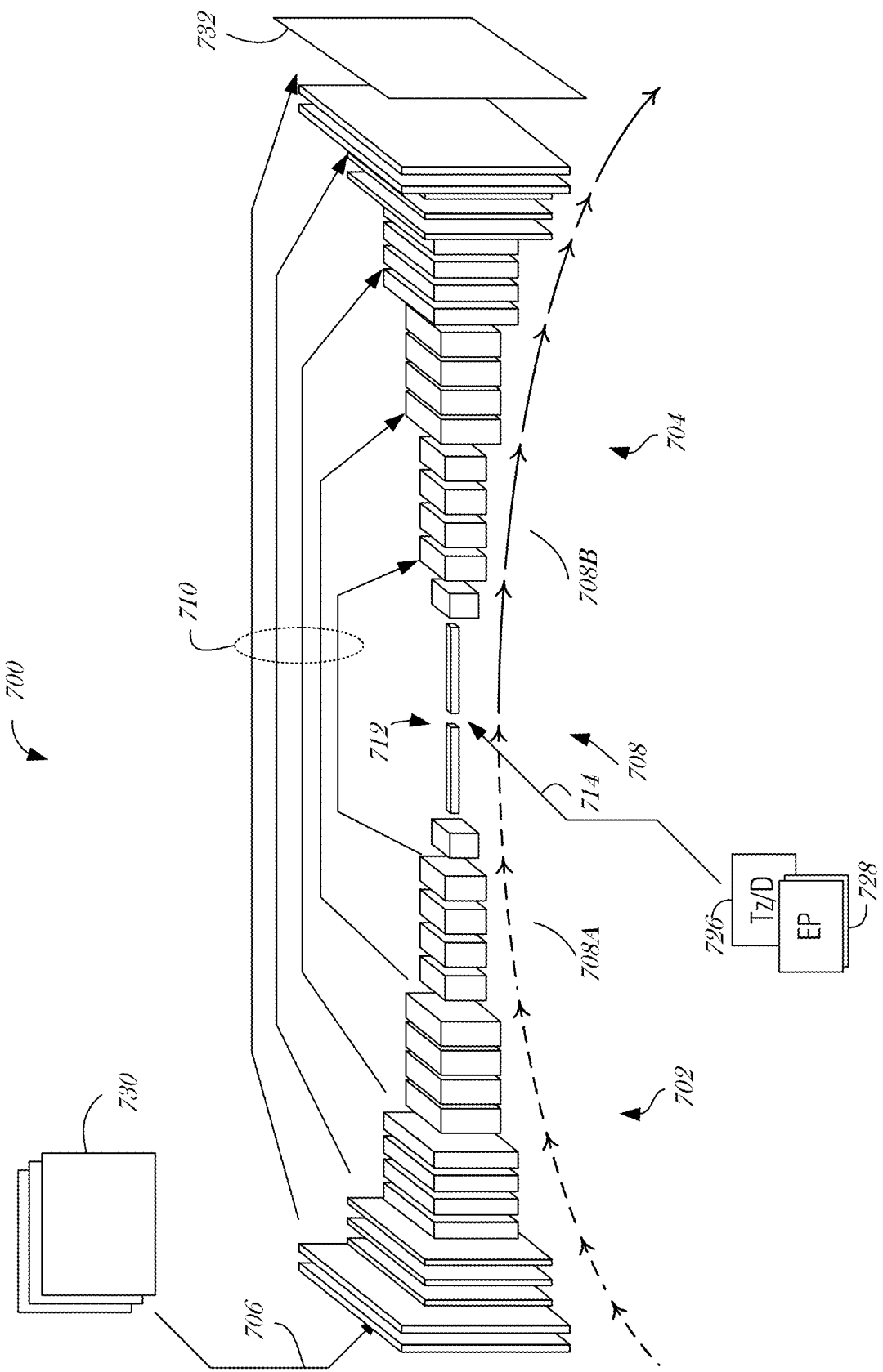
FIG. 7 illustrates an example deep neural network (DNN) of a machine-learning (ML)-based vertical contour engine, according to an embodiment.

FIG. 7 is a diagram illustrating an example DNN 700 of ML-based contour engine. In an example. As depicted, DNN 700 includes convolutional network portion 702 having various operational layers, which may include convolution, activation, normalization, and pooling layers. Other operational layers may be additionally included, such as inner product layers. In an example, the DNN 700 additionally includes deconvolution portion 704, including deconvolution (e.g., transposed convolutional), activation, normalization, and un-pooling layers.

In an example, the set of images 730 are provided as input 506 to convolutional network portion 702. Each layer produces a feature map, which is in turn passed to the subsequent layer for further processing along forward propagation path 708. As depicted, the operations of convolutional network portion 702 operate to progressively reduce resolution of the feature maps, while increasing the number of channels (dimensionality) of the feature maps along convolutional forward propagation path 708A. The operations of deconvolutional network portion 704 operate to progressively increase resolution of the feature maps, while decreasing their dimensionality along deconvolutional forward propagation path 708B.

In an example, in addition to forward propagation path 708, one or more bypass paths 710 may be provided to facilitate the passing of feature maps from a prior layer to a latter layer while skipping over one or more intermediary layers situated between those prior and latter layers. As an example, bypass paths 710 may pass feature maps between a layer of convolutional network portion 702, and a similarly-dimensioned layer of deconvolutional network portion 704.

A "bottleneck" network portion 712 is situated between convolutional network portion 702 and deconvolutional network portion 704. In an example, bottleneck network portion 712 has one or more layers with relatively lower resolution and higher dimensionality compared to other layers. In an example, bottleneck portion 712 includes inputs 714 that are configured to accept image-formatted motion indicia 726 and image-formatted epipole location data 728.

In an example, the DNN 700 is trained to produce road structure 732 as a pixel-wise mapping of gamma values corresponding to the current (i.e., most recent) image of preprocessed images 730. Road structure 732 as the output of DNN 700 may be at the same, or a different, resolution as images 730. For instance, the resolution of road structure 732 may be scaled by a factor or 0.25, 0.5, 1, 1.5, 2, or other scaling factor, which may be an integer or non-integer value.

In another an example, road structure 732 may correspond to a portion of the current image of preprocessed images 730. For instance, road structure 732 may correspond to a cropped image of field of view 400 (FIG. 4) that omits some portions thereof that do not represent the road surface.

Notably, gamma values in the pixels of road structure 732 are dimensionless values. In an example, DNN 700 produces as its output a mapping of other dimensionless values such as $$\frac{Z}{\delta Z}$$

for points above the horizon. When the value of gamma is known, distance Z and height of the road surface H may be recovered using the relationship $$Z = \frac{camH}{\gamma - N'\left(\frac{x}{f'}, \frac{y}{f'}, 1\right)},$$

where N' is N transposed, (x,y) are the image coordinates, and f is focal length.

Figure 8:
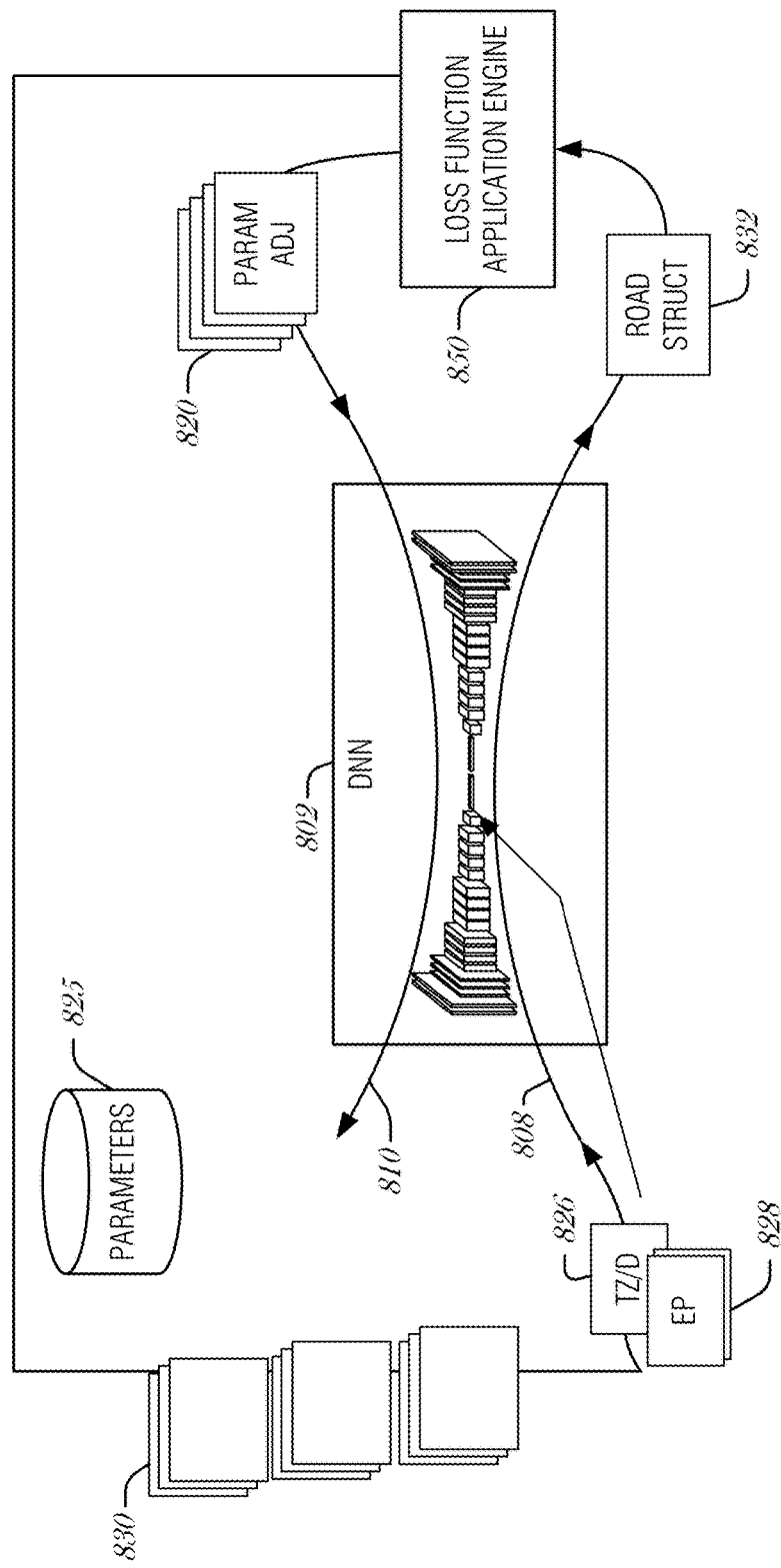
FIG. 8 illustrates an example of a DNN training engine, according to an embodiment.

FIG. 8 illustrates an example of a DNN training engine 800, according to an embodiment. DNN training engine 800 is configured to train DNN 700 to produce an accurate determination of road structure 732 based on a set of training data. As depicted, DNN training system 800 includes DNN 802 having the same or similar architecture as DNN 700, and loss function application engine 850.

Here, a loss function application engine 850 is configured to supply training data 830 as input to DNN 802. Training data 830 may include various sequences of image frames captured by one or more vehicle-mounted cameras. The image frames may include video footage captured on various roads, in various geographic locales, under various lighting and weather conditions, for example.

Training data 830 may be accompanied by image-formatted motion indicia 826 and image-formatted epipole indicia 828 corresponding to respective portions of training data 830. Image-formatted motion indicia 826 and image-formatted epipole indicia 828 may be fed to an input layer that differs from the input layer for the image frames of training data 830 to match the structural and operational arrangement of the DNN 802. The inputs are advanced through DNN 802 along forward propagation path 808 to produce road structure 832 as the output of the DNN 802.

The DNN 802 may be initially configured with randomized values of computational parameters (e.g., weights, biases, etc.). The training process works to adjust the values of the computational parameters to optimize the output of the DNN 802, the road structure 832. The loss function application engine 850 is configured to perform the parameter optimization. In an example, more than one loss functions is used to determine accuracy of the output of the DNN 802. The loss function application engine 850 produces computational parameter adjustments 820 for the various layers of DNN 802, which are instituted using back propagation along backwards propagation path 810.

In an example, computational parameter adjustments 820 for the various layers of the DNN 802 are collected and stored in computational-parameter data structure 825, which defines the training result of the DNN 802. In an example, the computational-parameter data structure 825 is passed (e.g., as part of the output of DNN training system) to a vertical contour detection engine, where it is stored as a computational parameter to configure a ML-based contour engine. In an example, inference engine training runs both on the current triplet and the future triplet to produce output_curr and output_future, respectively. The geometric loss may be combined with other losses from the output_curr, and propagated back to adjust the weights of the network and also the losses from output_future without the geometric loss are propagated to adjust the weights. In an example, the geometric losses of output_future may be ignored, with only the output_curr used for training.

In an implementation, the training data 830 includes unrectified (i.e., distorted) images. This is different from other prior implementations that rectified the input images. In the present implementation, the DNN 802 is trained using unrectified images so that at inference, images do not need to preprocessed (rectified) before being used in the neural network, which saves processing time and energy.

As discussed above, during training, the loss function application engine 850 is configured to perform the parameter optimization. To do this, a loss function is calculated using the gamma values in the gamma map output from the DNN 802.

Three gamma maps (e.g., current, previous, and previous-previous) may be compared to calculate the loss. However, because the gamma maps are of distorted images (unrectified images), there is no ground plane, and hence, there is no homography to align the gamma maps. Instead, a homography function is calculated using linear regression analysis. This homography function may be referred to as a "best-fit homography" because although it is not a perfect homography, it is good enough to perform loss analysis.

The process to find the homography function is as follows. Coordinate pairs are picked between a baseline gamma map and a current gamma map. The baseline may be the gamma map of three input images (e.g., the previous image, the previous-previous, and the previous-previous-previous image) and the current gamma map may be the gamma map of three input images starting with the current (most recently obtained) image (e.g., the current, previous, and previous-previous images).

The baseline coordinate in the baseline gamma map is rectified using rectification parameters. The rectification parameters may be similar or the same as those used to rectify images. However, instead of rectifying an image to produce a pinhole model image, coordinates in a gamma map are rectified to produce coordinates of a rectified gamma map. Then the same pixel is found in the current gamma map. An arbitrary number of coordinate points are mapped from the baseline gamma map to the current gamma map. These coordinate points are then used in a linear regression analysis to calculate the best-fit homography that describes these relationships.

The loss function is then based on a model created from the previous gamma map and the best-fit homography as compared to the current gamma map. This is an implementation of a photogrammetric loss function. In some implementations, more than a photogrammetric loss function is used.

The loss function components contributed by one or more of the loss functions are combined and used in backpropagation that is used to train the DNN, for example, using a gradient descent technique to generate computational parameter adjustments.

Training may be performed in individual cameras because distortion may be unique to a camera or camera type. Camera parameters may be used as input to the DNN 802, similar to how ego-motion is used.

In inference mode, the DNN uses a sequence of images as input and produces a gamma map as output. The input images are not rectified (distorted). A number of pixels inside the previous or previous-previous image are sampled. The number may be set by a customer based on what portions of the image are to be modeled. For instance, the number may be 100 pixels/points that are centered on a path of the vehicle. The number may be selected as a suitable number to detect a depression (pothole) or protrusion (speed bump) in the vehicle's path, for instance. Greater or fewer pixels/points may be sampled depending on the design of the modeling system.

The pixel sample is rectified using rectification parameters. These parameters may be based on camera design, lens attributes, or other characteristics of the image capture device or image processing pipeline.

Gamma values of the rectified pixels are used with regular geometric pinhole equations to model the road surface and obtain height above the ground plane and depth from the image capture device (gamma). Processing efficiency is gained by only rectifying a subset of the pixels in an image and using unrectified images as input to the ANN.

Figure 9:
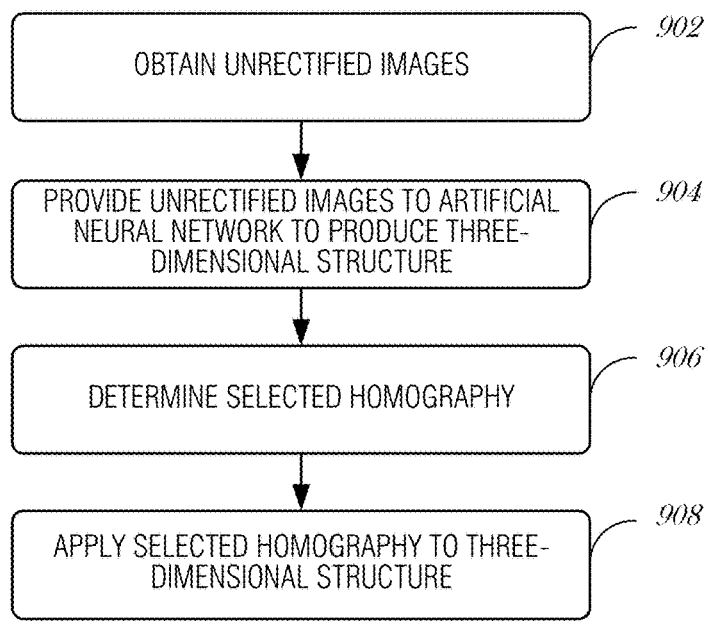
FIG. 9 is a flowchart illustrating an example of a method for modeling an environment around a vehicle, according to an embodiment.

FIG. 9 is a flowchart illustrating an example of a method 900 for modeling an environment around a vehicle, according to an embodiment. The operations of the method 900 are performed by computational hardware (e.g., processing circuitry), such as that described above or below.

At 902, a sequence of unrectified images representative of a road environment are obtained. The sequence of unrectified images may include a first unrectified image, a previous unrectified image, and a previous-previous unrectified image. In an embodiment, the sequence of unrectified images is time-ordered.

In an embodiment, the road environment includes a road surface. In an embodiment, the road environment includes a lane marker, a sidewalk, or a road control object. A lane marker includes painted lane markings, tactile lane markers, curbs, temporary construction barriers, or the like. A road control object includes various object including a traffic light, a stop sign, a speed limit sign, a road barrier, a traffic cone, or the like.

At 904, the first unrectified image, the previous unrectified image, and the previous-previous unrectified image are provided to an artificial neural network (ANN) to produce a three-dimensional structure of a scene.

At 906, a selected homography is determined. In an embodiment, the selected homography is a best-fit homography.

In an embodiment, the operation of determining the selected homography includes the operations of selecting a first set of image coordinates in the previous unrectified image, rectifying the first set of image coordinates to obtain a first set of rectified image coordinates, applying a pinhole homography to the first set of rectified image coordinates to identify corresponding image coordinates in the first unrectified image, distorting the corresponding image coordinates in the first unrectified image to obtain estimated positions of distorted image coordinates, and using a linear regression technique to determine the selected homography between the first set of image coordinates and the estimated positions of distorted image coordinates.

In an embodiment, the first set of image coordinates are pixels. In an embodiment, the operations to rectify the first set of image coordinates include operations to use rectification parameters for a lens used to capture the previous unrectified image. In an embodiment, the first set of image coordinates includes 50-200 image coordinates. In an embodiment, the operation of distorting the corresponding image coordinates includes the operation of using a lens distortion model for a lens used to capture the first unrectified image, the previous unrectified image, and the previous-previous unrectified image.

At 908, the selected homography is applied to the three-dimensional structure of the scene to create a model of the road environment. In an embodiment, the model of the road environment includes height above a ground plane and depth from an image capture device used to capture the sequence of unrectified images.

In an embodiment, the ANN is trained with an unsupervised training technique that include operations to: provide the first unrectified image, the previous unrectified image, and the previous-previous unrectified image to the artificial neural network (ANN) to produce a gamma image; rectify the gamma image to produce a rectified gamma image; and calculate a loss function using the rectified gamma image. In a further embodiment, the operations to rectify the gamma map include operations to use a lens distortion model. In a further embodiment, calculating the loss function includes calculating an error between a model of a future image and a future image, the model of the future image produced using the selected homography applied to the first unrectified image.

Figure 10:
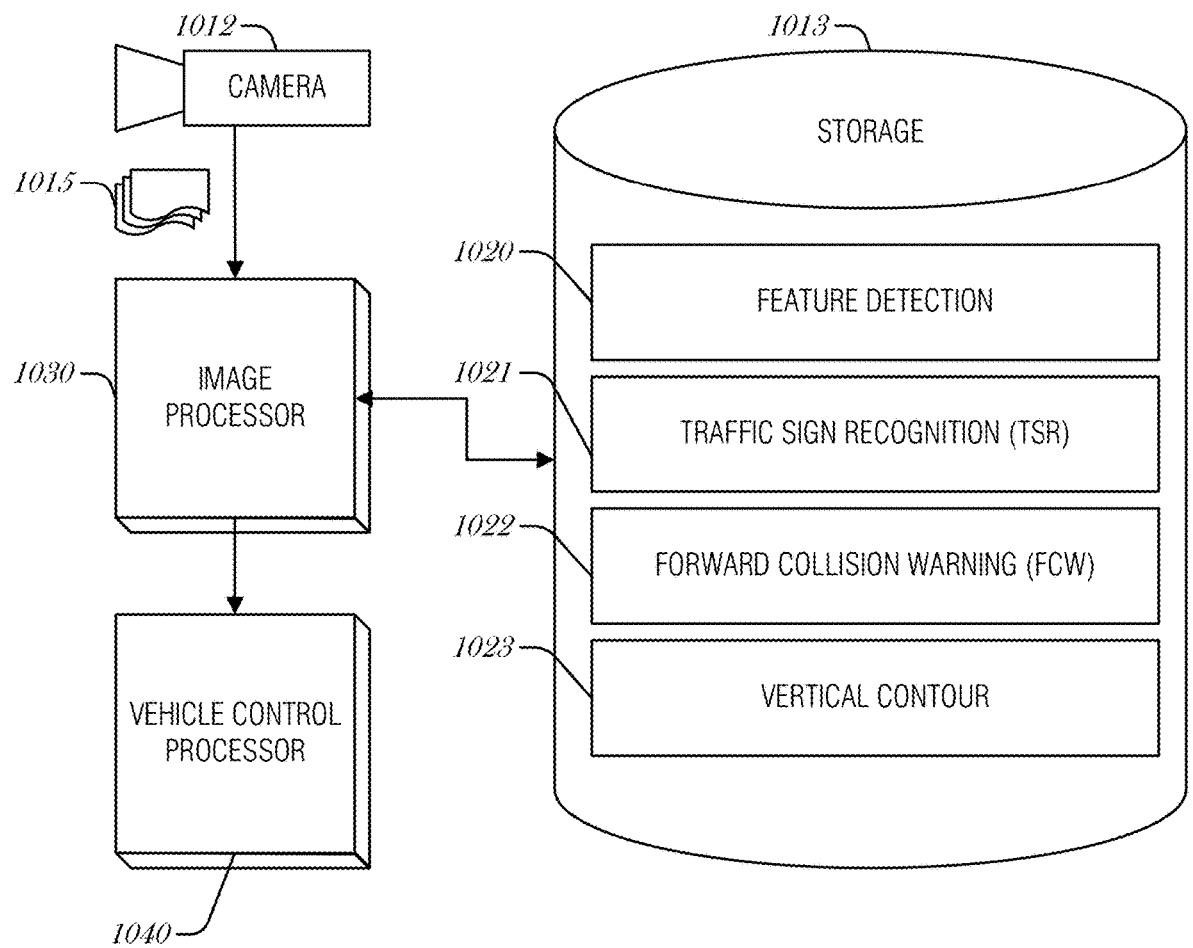
FIG. 10 illustrates a camera-based vehicle mounted system for profiling a road, for use with an autonomous vehicle control system, according to an embodiment.

FIG. 10 illustrates a camera-based vehicle mounted system for profiling a road, for use with an autonomous vehicle control system, according to an embodiment. As illustrated, the system is composed of a number of subsystems, components, circuits, modules, or engines, which for the sake of brevity and consistency are termed engines, although it will be understood that these terms may be used interchangeably. Engines are realized in hardware, or in hardware controlled by software or firmware. As such, engines are tangible entities specially-purposed for performing specified operations and are structured in a certain manner.

In an example, circuitry may be arranged (e.g., internally or with respect to external entities such as other circuits) in a specified manner as an engine. In an example, the whole or part of one or more hardware processors may be configured by firmware or software (e.g., instructions, an application portion, or an application) as an engine that operates to perform specified operations. In an example, the software may reside on a tangible machine-readable storage medium. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operation described herein.

Considering examples in which engines are temporarily configured, each of the engines need not be instantiated at any one moment in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

As depicted, the system includes a camera or image sensor 1012 mounted in or on vehicle. Each image sensor 1012 images a field of view, to provide image frames 1015, which are read by the image processor 1030. In an example, more than one camera 1012 may be mounted in the vehicle. For example, the system may have multiple cameras 1012 pointing in different directions. A system also may have multiple cameras 1012 pointing in the same or similar directions with respect to the vehicle but mounted at different locations. In an example, a system may have multiple cameras that have partially or completely overlapping fields of view (e.g., as described below with respect to FIGS. 11 and 12). In an example, two side-by-side cameras may operate in stereo. Although single-camera systems are discussed herein, multiple-camera systems may also be used, where some or all of the relevant images and frames may be captured by different cameras or may be created from a composite of images captured from multiple cameras. Real-time operation, in the present context, operates with imperceptible or nominal processing delay such that objects throughout a field of view are detected at a rate that is consistent with the rate at which the field of view is scanned or captured.

Image processor 1030 may be used to process image frames 1015 simultaneously or in parallel to serve a number of driver assistance systems or applications. Image processor 1030 may be used to process image frames 1015 to detect and recognize an image or portions of the image in the forward field of view of camera 1012. The driver assistance systems may be implemented using specific hardware circuitry (not shown) with on board software and/or software control algorithms in storage 1013. Image sensor 1012 may be monochrome, grayscale, or color-sensitive. By way of example, image frames 1015 are used to serve feature detection engine 1020, traffic sign recognition (TSR) engine 1021, forward collision warning (FCW) engine 1022, and vertical contour detection engine 1023. In an example, image frames 1015 are partitioned between different driver-assistance applications and in other cases the image frames 1015 may be shared between the different driver assistance applications.

In an example, the system is used to accurately estimate the planar (or bi-quadratic) model of the road surface, and compute small deviations from the planar (or bi-quadratic) road surface model to detect or quantify various surface features. The term "road surface model" in the present context refers to a planar or bi-quadratic model of the road surface. The term "vertical contour" or "vertical deviation" refers to the deviations from the road surface model along an axis perpendicular to the road surface.

In an example, the system is used to accurately model a road surface shape, such as vertical contour, using the camera 1012 mounted in a host vehicle. Using systems and methods provided herein, surface features such as bumps or holes, speed bumps, curbs, or manhole covers, may be measured or modeled as vertical deviations from the road surface (e.g., plane) with sub-pixel accuracy (e.g., on the order of 1-2 centimeters). These techniques may be similarly applied to forward, sideward, or rearward cameras 1012.

The gamma map may be useful for determining drivable areas in front of, or to the sides and rear, of the vehicle. The gamma map may be used on its own to determine places where the surface slope is too steep to drive, or it may be combined with grayscale or color image based semantic free space, as described in U.S. Patent Publication No. 2018/0101177, the entirety of which is incorporated herein by reference. The gamma map, or height map, of the road plane may be used to differentiate between sharp vertical edge curb stones, smoothly sloping curb stones, or soft shoulders (e.g., where a road drops off). The host vehicle may then be controlled to maintain a larger distance from a sharp curb stone or edge drop off than from a smoothly sloping curb stone.

In an example, the system may further include a vehicle control processor 1040 that implements one or more vehicle control engines for generating throttle, braking, steering, or transmission selection commands to the vehicle's electro-mechanical actuator systems to effect autonomous or semi-autonomous driving operations. The vehicle control processor 1040 may receive various outputs supplied by the image processor 1030 pertaining to the various machine-vision assessments produced by engines 1020-1023.

Figure 11:
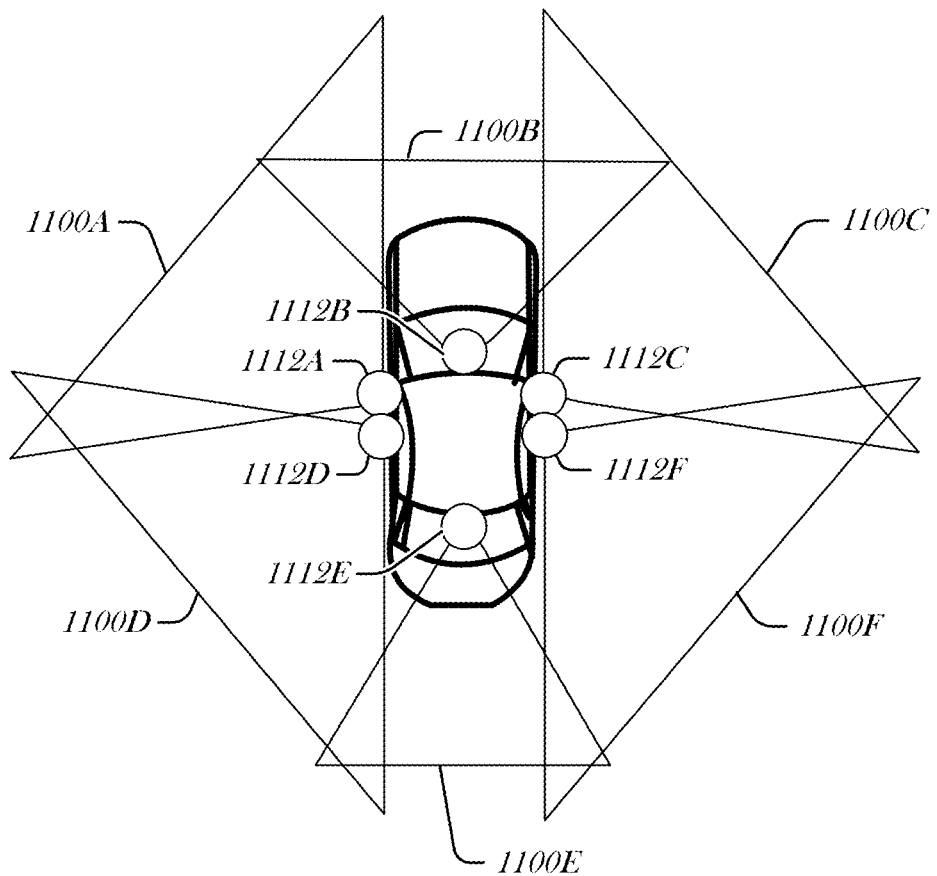
FIG. 11 illustrates a multiple-camera array on a vehicle, according to an embodiment.

FIG. 11 illustrates a multiple-camera array on a vehicle, according to an embodiment. As depicted, cameras 1112A-1112F are positioned around a vehicle to provide fields of view 1100A-1100F (e.g., such as those described below).

Figure 12:
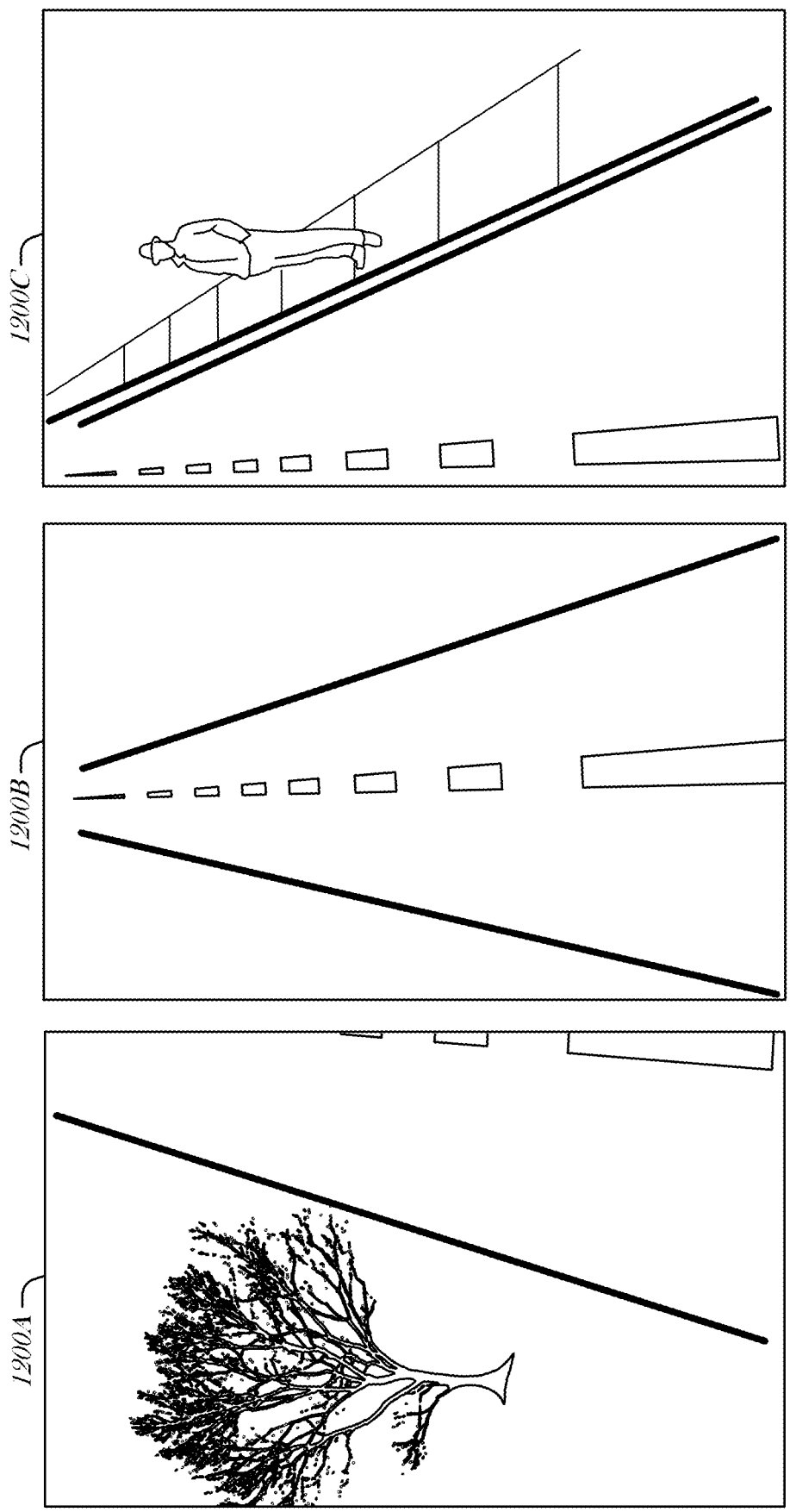
FIG. 12 illustrates examples of fields of view that may be captured by a multiple-camera array, according to an embodiment.

FIG. 12 illustrates examples of fields of view that may be captured by a multiple-camera array, according to an embodiment. Multiple overlapping fields of view 1200A-1200C are illustrated. Here, the road surface is common to the views.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hard-wired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 13:
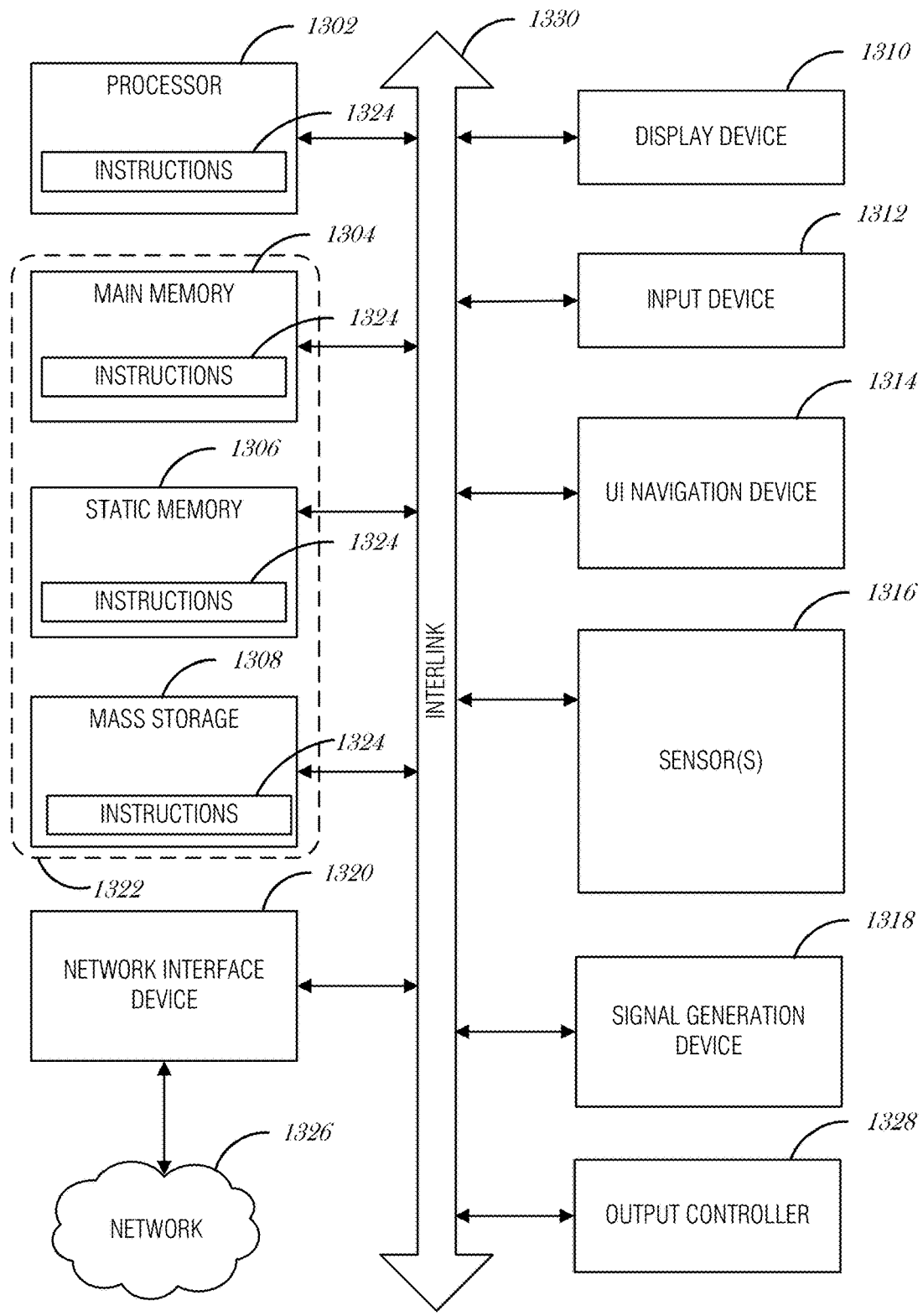
FIG. 13 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hard-wired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 13 is a block diagram illustrating a machine in the example form of a computer system 1300, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1300 includes at least one processor 1302 (e.g., a central processing unit (CPU), a graphics processing unit (GPU) or both, processor cores, compute nodes, etc.), a main memory 1304 and a static memory 1306, which communicate with each other via a link 1308 (e.g., bus). The computer system 1300 may further include a video display unit 1310, an alphanumeric input device 1312 (e.g., a keyboard), and a user interface (UI) navigation device 1314 (e.g., a mouse). In one embodiment, the video display unit 1310, input device 1312 and UI navigation device 1314 are incorporated into a touch screen display. The computer system 1300 may additionally include a storage device 1316 (e.g., a drive unit), a signal generation device 1318 (e.g., a speaker), a network interface device 1320, and one or more sensors (not shown), such as a global positioning system (GPS) sensor, compass, accelerometer, gyrometer, magnetometer, or other sensor.

The storage device 1316 includes a machine-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304, static memory 1306, and/or within the processor 1302 during execution thereof by the computer system 1300, with the main memory 1304, static memory 1306, and the processor 1302 also constituting machine-readable media.

While the machine-readable medium 1322 is illustrated in an example embodiment to be a single medium, the term "machine-readable medium" may include a single medium or multiple media (e.g., a centralized or distributed database, and/or associated caches and servers) that store the one or more instructions 1324. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1324 may further be transmitted or received over a communications network 1326 using a transmission medium via the network interface device 1320 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a device for modeling an environment, the device comprising: a hardware sensor interface to obtain a sequence of unrectified images representative of a road environment, the sequence of unrectified images including a first unrectified image, a previous unrectified image, and a previous-previous unrectified image; and processing circuitry to: provide the first unrectified image, the previous unrectified image, and the previous-previous unrectified image to an artificial neural network (ANN) to produce a three-dimensional structure of a scene; determine a selected homography; and apply the selected homography to the three-dimensional structure of the scene to create a model of the road environment.

In Example 2, the subject matter of Example 1 includes, wherein the sequence of unrectified images is time-ordered.

In Example 3, the subject matter of Examples 1-2 includes, wherein the selected homography is a best-fit homography.

In Example 4, the subject matter of Examples 1-3 includes, wherein
the road environment includes a road surface.

In Example 5, the subject matter of Examples 1-4 includes, wherein the road environment includes a lane marker, a sidewalk, or a road control object.

In Example 6, the subject matter of Examples 1-5 includes, wherein to determine the selected homography, the processing circuitry is to: select a first set of image coordinates in the previous unrectified image; rectify the first set of image coordinates to obtain a first set of rectified image coordinates; apply a pinhole homography to the first set of rectified image coordinates to identify corresponding image coordinates in the first unrectified image; distort the corresponding image coordinates in the first unrectified image to obtain estimated positions of distorted image coordinates; and use a linear regression technique to determine the selected homography between the first set of image coordinates and the estimated positions of distorted image coordinates.

In Example 7, the subject matter of Example 6 includes, wherein the first set of image coordinates are pixels.

In Example 8, the subject matter of Examples 6-7 includes, wherein to rectify the first set of image coordinates includes using rectification parameters for a lens used to capture the previous unrectified image.

In Example 9, the subject matter of Examples 6-8 includes, image coordinates.

In Example 10, the subject matter of Examples 6-9 includes, wherein to distort the corresponding image coordinates, the processing circuitry is to use a lens distortion model for a lens used to capture the first unrectified image, the previous unrectified image, and the previous-previous unrectified image.

In Example 11, the subject matter of Examples 1-10 includes, wherein the model of the road environment includes height above a ground plane and depth from an image capture device used to capture the sequence of unrectified images.

In Example 12, the subject matter of Examples 1-11 includes, wherein the ANN is trained with an unsupervised training technique that include operations to: provide the first unrectified image, the previous unrectified image, and the previous-previous unrectified image to the artificial neural network (ANN) to produce a gamma image; rectify the gamma image to produce a rectified gamma image; and calculate a loss function using the rectified gamma image.

In Example 13, the subject matter of Example 12 includes, wherein to rectify the gamma map, the processing circuitry is to use a lens distortion model.

In Example 14, the subject matter of Examples 12-13 includes, wherein to calculate the loss function, the processing circuitry is to calculate an error between a model of a future image and a future image, the model of the future image produced using the selected homography applied to the first unrectified image.

Example 15 is a method for modeling an environment, comprising: obtaining a sequence of unrectified images representative of a road environment, the sequence of unrectified images including a first unrectified image, a previous unrectified image, and a previous-previous unrectified image; providing the first unrectified image, the previous unrectified image, and the previous-previous unrectified image to an artificial neural network (ANN) to produce a three-dimensional structure of a scene; determining a selected homography; and applying the selected homography to the three-dimensional structure of the scene to create a model of the road environment.

In Example 16, the subject matter of Example 15 includes, wherein the sequence of unrectified images is time-ordered.

In Example 17, the subject matter of Examples 15-16 includes, wherein the selected homography is a best-fit homography.

In Example 18, the subject matter of Examples 15-17 includes, wherein the road environment includes a road surface.

In Example 19, the subject matter of Examples 15-18 includes, wherein the road environment includes a lane marker, a sidewalk, or a road control object.

In Example 20, the subject matter of Examples 15-19 includes, wherein determining the selected homography comprises: selecting a first set of image coordinates in the previous unrectified image; rectifying the first set of image coordinates to obtain a first set of rectified image coordinates; applying a pinhole homography to the first set of rectified image coordinates to identify corresponding image coordinates in the first unrectified image; distorting the corresponding image coordinates in the first unrectified image to obtain estimated positions of distorted image coordinates; and using a linear regression technique to determine the selected homography between the first set of image coordinates and the estimated positions of distorted image coordinates.

In Example 21, the subject matter of Example 20 includes, wherein the first set of image coordinates are pixels.

In Example 22, the subject matter of Examples 20-21 includes, wherein to rectify the first set of image coordinates includes using rectification parameters for a lens used to capture the previous unrectified image.

In Example 23, the subject matter of Examples 20-22 includes, image coordinates.

In Example 24, the subject matter of Examples 20-23 includes, wherein distorting the corresponding image coordinates comprises using a lens distortion model for a lens used to capture the first unrectified image, the previous unrectified image, and the previous-previous unrectified image.

In Example 25, the subject matter of Examples 15-24 includes, wherein the model of the road environment includes height above a ground plane and depth from an image capture device used to capture the sequence of unrectified images.

In Example 26, the subject matter of Examples 15-25 includes, wherein the ANN is trained with an unsupervised training technique that include operations to: provide the first unrectified image, the previous unrectified image, and the previous-previous unrectified image to the artificial neural network (ANN) to produce a gamma image; rectify the gamma image to produce a rectified gamma image; and calculate a loss function using the rectified gamma image.

In Example 27, the subject matter of Example 26 includes, wherein to rectify the gamma map, the unsupervised training technique is to use a lens distortion model.

In Example 28, the subject matter of Examples 26-27 includes, wherein calculating the loss function comprises calculating an error between a model of a future image and a future image, the model of the future image produced using the selected homography applied to the first unrectified image.

Example 29 is at least one machine-readable medium including instructions for modeling an environment, the instructions, when executed by processing circuitry, cause the processing circuitry to perform operations comprising:

obtaining a sequence of unrectified images representative of a road environment, the sequence of unrectified images including a first unrectified image, a previous unrectified image, and a previous-previous unrectified image; providing the first unrectified image, the previous unrectified image, and the previous-previous unrectified image to an artificial neural network (ANN) to produce a three-dimensional structure of a scene; determining a selected homography; and applying the selected homography to the three-dimensional structure of the scene to create a model of the road environment.

In Example 30, the subject matter of Example 29 includes, wherein the sequence of unrectified images is time-ordered.

In Example 31, the subject matter of Examples 29-30 includes, wherein the selected homography is a best-fit homography.

In Example 32, the subject matter of Examples 29-31 includes, wherein the road environment includes a road surface.

In Example 33, the subject matter of Examples 29-32 includes, wherein the road environment includes a lane marker, a sidewalk, or a road control object.

In Example 34, the subject matter of Examples 29-33 includes, wherein the operations to determine the selected homography, comprise operations to: select a first set of image coordinates in the previous unrectified image; rectify the first set of image coordinates to obtain a first set of rectified image coordinates; apply a pinhole homography to the first set of rectified image coordinates to identify corresponding image coordinates in the first unrectified image; distort the corresponding image coordinates in the first unrectified image to obtain estimated positions of distorted image coordinates; and use a linear regression technique to determine the selected homography between the first set of image coordinates and the estimated positions of distorted image coordinates.

In Example 35, the subject matter of Example 34 includes, wherein the first set of image coordinates are pixels.

In Example 36, the subject matter of Examples 34-35 includes, wherein to rectify the first set of image coordinates includes using rectification parameters for a lens used to capture the previous unrectified image.

In Example 37, the subject matter of Examples 34-36 includes, image coordinates.

In Example 38, the subject matter of Examples 34-37 includes, wherein the operations to distort the corresponding image coordinates comprise operations to use a lens distortion model for a lens used to capture the first unrectified image, the previous unrectified image, and the previous-previous unrectified image.

In Example 39, the subject matter of Examples 29-38 includes, wherein the model of the road environment includes height above a ground plane and depth from an image capture device used to capture the sequence of unrectified images.

In Example 40, the subject matter of Examples 29-39 includes, wherein the ANN is trained with an unsupervised training technique that include operations to: provide the first unrectified image, the previous unrectified image, and the previous-previous unrectified image to the artificial neural network (ANN) to produce a gamma image; rectify the gamma image to produce a rectified gamma image; and calculate a loss function using the rectified gamma image.

In Example 41, the subject matter of Example 40 includes, wherein to rectify the gamma map, the processing circuitry is to use a lens distortion model.

In Example 42, the subject matter of Examples 40-41 includes, wherein the operations to calculate the loss function comprise operations to calculate an error between a model of a future image and a future image, the model of the future image produced using the selected homography applied to the first unrectified image.

Example 43 is at least one machine-readable medium including instructions that, when executed by processing circuitry, cause the processing circuitry to perform operations to implement of any of Examples 1-42.

Example 44 is an apparatus comprising means to implement of any of Examples 1-42.

Example 45 is a system to implement of any of Examples 1-42.

Example 46 is a method to implement of any of Examples 1-42.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for modeling an environment, comprising:
obtaining a sequence of unrectified images representative of a road environment, the sequence of unrectified images including a first unrectified image, a previous unrectified image, and a previous-previous unrectified image;
calculating a best-fit homography from a pinhole homography and rectification parameters for a lens used to capture the first unrectified image;
warping the previous unrectified image and the previous-previous unrectified image to the first unrectified image using the best-fit homography, to obtain a warped previous unrectified image and a warped previous-previous unrectified image;
providing the first unrectified image, the warped previous unrectified image, and the warped previous-previous unrectified image to an artificial neural network (ANN) to produce a three-dimensional structure of a scene; and
applying the best-fit homography to the three-dimensional structure of the scene to create a model of the road environment.

2. The method of claim 1, wherein the sequence of unrectified images is time-ordered.

3. The method of claim 1, wherein the road environment includes a road surface.

4. The method of claim 1, wherein the road environment includes a lane marker, a sidewalk, or a road control object.

5. The method of claim 1, wherein calculating the best-fit homography comprises:
selecting a first set of image coordinates in the previous unrectified image;
rectifying the first set of image coordinates to obtain a first set of rectified image coordinates;
applying the pinhole homography to the first set of rectified image coordinates to identify corresponding image coordinates in the first unrectified image;
distorting the corresponding image coordinates in the first unrectified image to obtain estimated positions of distorted image coordinates; and
using a modeling technique to determine the best-fit homography between the first set of image coordinates and the estimated positions of distorted image coordinates.

6. The method of claim 5, wherein the first set of image coordinates are pixels.

7. The method of claim 5, wherein the first set of image coordinates includes 50-200 image coordinates.

8. The method of claim 5, wherein distorting the corresponding image coordinates comprises using a lens distortion model for a lens used to capture the first unrectified image, the previous unrectified image, and the previous-previous unrectified image.

9. The method of claim 5, wherein the modeling technique is a linear regression technique.

10. The method of claim 1, wherein the model of the road environment includes height above a ground plane and depth from an image capture device used to capture the sequence of unrectified images.

11. The method of claim 1, wherein the ANN is trained with an unsupervised training technique that include operations to:
provide the first unrectified image, the warped previous unrectified image, and the warped previous-previous unrectified image to the artificial neural network (ANN) to produce a gamma image;
rectify the gamma image to produce a rectified gamma image; and
calculate a loss function using the rectified gamma image.

12. The method of claim 11, wherein to rectify the gamma image, the unsupervised training technique is to use a lens distortion model.

13. The method of claim 11, wherein calculating the loss function comprises calculating an error between a model of a future image and a future image, the model of the future image produced using the best-fit homography applied to the first unrectified image.

14. A device for modeling an environment, the device comprising:
a hardware sensor interface to obtain a sequence of unrectified images representative of a road environment, the sequence of unrectified images including a first unrectified image, a previous unrectified image, and a previous-previous unrectified image; and
processing circuitry to:
calculate a best-fit homography from a pinhole homography and rectification parameters for a lens used to capture the first unrectified image;
warp the previous unrectified image and the previous-previous unrectified image to the first unrectified image using the best-fit homography, to obtain a warped previous unrectified image and a warped previous-previous unrectified image;
provide the first unrectified image, the warped previous unrectified image, and the warped previous-previous unrectified image to an artificial neural network (ANN) to produce a three-dimensional structure of a scene; and
apply the best-fit homography to the three-dimensional structure of the scene to create a model of the road environment.

15. The device of claim 14, wherein the sequence of unrectified images is time-ordered.

16. The device of claim 14, wherein the road environment includes a road surface.

17. The device of claim 14, wherein the road environment includes a lane marker, a sidewalk, or a road control object.

18. The device of claim 14, wherein to calculate the best-fit homography, the processing circuitry is to:
select a first set of image coordinates in the previous unrectified image;
rectify the first set of image coordinates to obtain a first set of rectified image coordinates;
apply the pinhole homography to the first set of rectified image coordinates to identify corresponding image coordinates in the first unrectified image;
distort the corresponding image coordinates in the first unrectified image to obtain estimated positions of distorted image coordinates; and use a modeling technique to determine the best-fit homography between the first set of image coordinates and the estimated positions of distorted image coordinates.

19. The device of claim 18, wherein the first set of image coordinates are pixels.

20. The device of claim 18, wherein the first set of image coordinates includes 50-200 image coordinates.

21. The device of claim 18, wherein to distort the corresponding image coordinates, the processing circuitry is to use a lens distortion model for a lens used to capture the first unrectified image, the previous unrectified image, and the previous-previous unrectified image.

22. The device of claim 18, wherein the modeling technique is a linear regression technique.

23. The device of claim 14, wherein the model of the road environment includes height above a ground plane and depth from an image capture device used to capture the sequence of unrectified images.

24. The device of claim 14, wherein the ANN is trained with an unsupervised training technique that include operations to:
provide the first unrectified image, the warped previous unrectified image, and the warped previous-previous unrectified image to the artificial neural network (ANN) to produce a gamma image;
rectify the gamma image to produce a rectified gamma image; and
calculate a loss function using the rectified gamma image.

25. The device of claim 24, wherein to rectify the gamma image, the processing circuitry is to use a lens distortion model.

26. The device of claim 24, wherein to calculate the loss function, the processing circuitry is to calculate an error between a model of a future image and a future image, the model of the future image produced using the best-fit homography applied to the first unrectified image.

27. At least one non-transitory machine-readable medium including instructions for modeling an environment, the instructions, when executed by processing circuitry, cause the processing circuitry to perform operations comprising:
obtaining a sequence of unrectified images representative of a road environment, the sequence of unrectified images including a first unrectified image, a previous unrectified image, and a previous-previous unrectified image;
calculating a best-fit homography from a pinhole homography and rectification parameters for a lens used to capture the first unrectified image;
warping the previous unrectified image and the previous-previous unrectified image to the first unrectified image using the best-fit homography, to obtain a warped previous unrectified image and a warped previous-previous unrectified image;
providing the first unrectified image, the warped previous unrectified image, and the warped previous-previous unrectified image to an artificial neural network (ANN) to produce a three-dimensional structure of a scene; and
applying the best-fit homography to the three-dimensional structure of the scene to create a model of the road environment.

28. The non-transitory machine-readable medium of claim 27, wherein the sequence of unrectified images is time-ordered.

29. The non-transitory machine-readable medium of claim 27, wherein the road environment includes a road surface.

30. The non-transitory machine-readable medium of claim 27, wherein the road environment includes a lane marker, a sidewalk, or a road control object.

31. The non-transitory machine-readable medium of claim 27, wherein the operations to calculate the best-fit homography, comprise operations to:
select a first set of image coordinates in the previous unrectified image;
rectify the first set of image coordinates to obtain a first set of rectified image coordinates;
apply the pinhole homography to the first set of rectified image coordinates to identify corresponding image coordinates in the first unrectified image;
distort the corresponding image coordinates in the first unrectified image to obtain estimated positions of distorted image coordinates; and
use a modeling technique to determine the best-fit homography between the first set of image coordinates and the estimated positions of distorted image coordinates.

32. The non-transitory machine-readable medium of claim 31, wherein the first set of image coordinates are pixels.

33. The non-transitory machine-readable medium of claim 31, wherein the first set of image coordinates includes 50-200 image coordinates.

34. The non-transitory machine-readable medium of claim 31, wherein the operations to distort the corresponding image coordinates comprise operations to use a lens distortion model for a lens used to capture the first unrectified image, the previous unrectified image, and the previous-previous unrectified image.

35. The non-transitory machine-readable medium of claim 31, wherein the modeling technique is a linear regression technique.

36. The non-transitory machine-readable medium of claim 27, wherein the model of the road environment includes height above a ground plane and depth from an image capture device used to capture the sequence of unrectified images.

37. The non-transitory machine-readable medium of claim 27, wherein the ANN is trained with an unsupervised training technique that include operations to:
provide the first unrectified image, the warped previous unrectified image, and the warped previous-previous unrectified image to the artificial neural network (ANN) to produce a gamma image;
rectify the gamma image to produce a rectified gamma image; and
calculate a loss function using the rectified gamma image.

38. The non-transitory machine-readable medium of claim 37, wherein to rectify the gamma image, the processing circuitry is to use a lens distortion model.

39. The non-transitory machine-readable medium of claim 37, wherein the operations to calculate the loss function comprise operations to calculate an error between a model of a future image and a future image, the model of the future image produced using the selected best-fit homography applied to the first unrectified image.

* * * * *

UNITED STATES PATENT AND TRADEMARK OFFICE
CERTIFICATE OF CORRECTION

Page 1 of 1

PATENT NO. : 12,223,744 B2
APPLICATION NO. : 17/777212
DATED : February 11, 2025
INVENTOR(S) : Stein et al.

It is certified that error appears in the above-identified patent and that said Letters Patent is hereby corrected as shown below:

In the Claims

In Column 30, Line 61, in Claim 39, after "the", delete "selected"

Signed and Sealed this
Twenty-fifth Day of November, 2025

John A. Squires
*Director of the United States Patent and Trademark Office*